(12) United States Patent
Buscaglia et al.

(10) Patent No.: US 12,242,827 B1
(45) Date of Patent: Mar. 4, 2025

(54) DYNAMIC USER INTERFACE CUSTOMIZATION FOR NO-CODE APPLICATION DEVELOPMENT

(71) Applicant: People Center, Inc., San Francisco, CA (US)

(72) Inventors: Daniel Robert Buscaglia, San Francisco, CA (US); Ryan Byers Spraetz, San Francisco, CA (US); Sahin Olut, San Francisco, CA (US); Michael Bitzos, Toronto (CA)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/650,541

(22) Filed: Apr. 30, 2024

(51) Int. Cl.
   *G06F 8/38* (2018.01)
(52) U.S. Cl.
   CPC ..................... *G06F 8/38* (2013.01)
(58) Field of Classification Search
   None
   See application file for complete search history.

(56) References Cited

U.S. PATENT DOCUMENTS

| | | | |
|---|---|---|---|
| 7,137,100 | B2 | 11/2006 | Iborra et al. |
| 8,346,563 | B1 | 1/2013 | Hjelm et al. |
| 9,848,061 | B1 | 12/2017 | Jain et al. |
| 10,970,142 | B2 | 4/2021 | Diekmann et al. |
| 11,507,820 | B1 | 11/2022 | Varrichio |
| 2005/0010606 | A1 | 1/2005 | Kaiser et al. |
| 2008/0027896 | A1 | 1/2008 | Anjur |
| 2012/0136503 | A1 | 5/2012 | Schunder |
| 2013/0239126 | A1 | 9/2013 | Sun |
| 2014/0222494 | A1 | 8/2014 | Leitch et al. |
| 2017/0118220 | A1 | 4/2017 | Barbara et al. |

(Continued)

FOREIGN PATENT DOCUMENTS

| | | |
|---|---|---|
| CN | 116679912 | 9/2023 |
| WO | WO 2023183408 | 9/2023 |

OTHER PUBLICATIONS

International Search Report and Written Opinion for Application No. PCT/US2022/038304, mailed Oct. 26, 2022, 12 pages.

(Continued)

*Primary Examiner* — Toan H Vu
(74) *Attorney, Agent, or Firm* — Dority & Manning, P.A.

(57) ABSTRACT

Systems, computer-implemented methods, applications, and user interfaces for defining custom user interfaces in a system of record are disclosed. For example, a computer-implemented method may include: providing one or more first interfaces for defining one or more custom objects; receiving, via the one or more first interfaces, at least one custom object definition comprising one or more data fields; automatically generating, based on the at least one custom object definition, one or more second interfaces for configuring one or more graphical user interfaces; receiving, via the one or more second interfaces, at least one graphical user interface configuration defining a layout for a graphical user interface associated with the at least one custom object definition; generating, based on the graphical user interface configuration, at least one third interface comprising a graphical user interface having the layout; and providing, to one or more users, the at least one third interface.

19 Claims, 15 Drawing Sheets

(56) References Cited

U.S. PATENT DOCUMENTS

| | | |
|---|---|---|
| 2018/0293116 A1 | 10/2018 | Segal et al. |
| 2019/0095386 A1 | 3/2019 | Dang et al. |
| 2019/0318068 A1 | 10/2019 | Melo et al. |
| 2021/0397620 A1 | 12/2021 | Wikkerink et al. |
| 2023/0127029 A1 | 4/2023 | Costa, Jr. |
| 2023/0230006 A1 | 7/2023 | Bosch |
| 2023/0409346 A1* | 12/2023 | Nguyen ............. H04L 41/0803 |
| 2024/0119043 A1* | 4/2024 | Panesar ............. G06F 16/2379 |
| 2024/0134874 A1 | 4/2024 | Blonski |

OTHER PUBLICATIONS

Georgakopoulos, Diimitrios, Mark Hornick, and Amit Sheth. "An overview of workflow management: From process modeling to workflow automation infrastructure." Distributed and parallel Databases 3 (1995): 119-153. (Year: 1995).

Raisch, Sebastian, and Sebastian Krakowski. "Artificial intelligence and management: The automation-augmentation paradox." Academy of management review 46.1 (2021): 192-210. (Year: 2021).

Marrella, Andrea. "Automated planning for business process management." Journal on data semantics 8.2 (2019): 79-98. (Year:2019).

\* cited by examiner

Data Manager

All objects   Data collected — 706

Select Category [ Audits ⌄ ] — 708

| Object name | Category | API name | Type | Last modified |
|---|---|---|---|---|
| Audit<br>Audit objects for Global Payroll | Audits | audit__c | Custom object | Jon Johnson on 12/31/2099 |
| Audit Item<br>Audit items for Global Payroll | Audits | audit_item__c | Custom object | Dave Davidson on 12/31/2088 |
| Audit Run<br>Audit run object for Global Payroll | Audits | audit_item__c | Custom object | Tom Thompson on 12/31/2088 |

710 (rows)

712 — [ Create Custom Object ]

FIG. 7B

Data Manager

All fields  Showing 7 of 7                    Search: [        ] Add field   •••

| Field name | Data Type | API name | Field type | Required | Unique |
|---|---|---|---|---|---|
| ID | Text | id | Standard | Yes | Yes |
| Last modified | DateTime | updated_at | Standard | Yes | No |
| Name | Text | name | Standard | Yes | No |
| Owner | Lookup | owner_role | Standard | No | No |
| category | Text | category__c | Custom | No | No |
| last_run | DateTime | last_run__c | Custom | No | No |
| num_items | Number | num_items__c | Formula | No | No |

FIG. 7C

Select fields

Department Audit View 737

- ☐ ID — 738a
- ☐ Last Modified — 738b
- ☐ Name — 738c
- ☐ Owner — 738d
- ☐ category — 738e
- ☐ last_run — 738f
- ☐ num_items — 738g

739

← Exit

GP Audits

748 — Audit    Audit Item

750 — 
- All Audits ✓
- My Audits
- My Team's Audits

754 — Add record

| 756e category | 756f last_run | 756g num_items | 756d Owner | 756a ID |
|---|---|---|---|---|
| Tax | 07/04/2066 | 2 | Dave Davidson | 123456 |
| U.S. Payroll | 12/25/2077 | 17 | Jon Johnson | 234567 |
| Europe Payroll | 10/31/2055 | 3,944 | Eric Ericsson | 345678 |
| Tax | 03/14/2044 | 5 | Dave Davidson | 456789 |
| Tax | 05/04/2033 | 3 | Dave Davidson | 567890 |

DYNAMIC USER INTERFACE CUSTOMIZATION FOR NO-CODE APPLICATION DEVELOPMENT

FIELD

The present disclosure generally relates to computer systems. More particularly, the present disclosure relates to providing no-code and low-code development of custom user interfaces and custom applications.

BACKGROUND

Organizations use different types of software applications and computing systems to manage processes and information across an enterprise. Generally, each different application and computing system provides specialized features, functionality, and operations directed toward a specific solution. However, different applications and systems usually operate in isolation without communicating with one another and maintain their own separate sets of organizational information. As a result, organizational information often remains siloed and becomes inconsistent and inaccurate when one or more changes are not reflected across different applications and systems.

Further, integrating new applications or systems into an enterprise may require bespoke software integrations performed by one or more computer programmers, who may require specialized knowledge of the application being integrated; specialized knowledge of an enterprise computing environment the application is being integrated into; and specialized knowledge of one or more programming languages, frameworks, etc., which may be unique to the particular application being integrated.

In some instances, integrating new applications into an enterprise can require one or more computer programmers to build one or more custom data structures (e.g., custom data tables, data objects, collections, etc.) for integrating the application, and write custom-data-structure-specific computer code in a programming language to integrate the custom data structures into an existing enterprise computing environment. In some instances, enabling users to interact with custom data structures can require one or more computer programmers to write computer code in a programming language to define custom user interfaces and/or custom software applications.

SUMMARY

Aspects and advantages of embodiments of the present disclosure will be set forth in part in the following description, or can be learned from the description, or can be learned through practice of the embodiments.

An example embodiment of the present disclosure is directed to a computer system that can implement an organizational management platform for an organization. The computer system can include one or more processors. The computer system can further include one or more databases that can collectively store organizational data associated with the organization. The organizational data can include an object graph data structure that can include a plurality of data objects that can respectively correspond to a plurality of entities of the organization. The computer system can further include one or more non-transitory computer-readable media that can collectively store instructions that, when executed by the one or more processors, can cause the computer system to perform operations. The operations can include providing one or more first interfaces for defining one or more custom objects. The operations can include receiving, via the one or more first interfaces, at least one custom object definition comprising one or more data fields. The operations can include automatically generating, based on the at least one custom object definition, one or more second interfaces for configuring one or more graphical user interfaces. The operations can include receiving, via the one or more second interfaces, at least one graphical user interface configuration defining a layout for a graphical user interface associated with the at least one custom object definition. The operations can include generating, based on the graphical user interface configuration, at least one third interface, wherein the third interface comprises at least one graphical user interface having the layout. The operations can include providing, to one or more users, the at least one third interface.

Another example aspect of the present disclosure is directed to a computer-implemented method for providing user-defined custom graphical user interfaces (GUIs) associated with user-defined custom data objects. For example, a computer-implemented method performed by a computing system comprising one or more computing devices may include providing one or more first interfaces for defining one or more custom objects; receiving, via the one or more first interfaces, at least one custom object definition comprising one or more data fields; automatically generating, based on the at least one custom object definition, one or more second interfaces for configuring one or more graphical user interfaces; receiving, via the one or more second interfaces, at least one graphical user interface configuration defining a layout for a graphical user interface associated with the at least one custom object definition; generating, based on the graphical user interface configuration, at least one third interface, wherein the third interface comprises at least one graphical user interface having the layout; providing, to one or more users, the at least one third interface.

Another example aspect of the present disclosure is directed to one or more tangible non-transitory computer-readable media storing computer-readable instructions that, when executed by one or more processors, cause the one or more processors of a computing system to perform operations. For example, the operations may include providing one or more first interfaces for defining one or more custom objects; receiving, via the one or more first interfaces, at least one custom object definition comprising one or more data fields; automatically generating, based on the at least one custom object definition, one or more second interfaces for configuring one or more graphical user interfaces; receiving, via the one or more second interfaces, at least one graphical user interface configuration defining a layout for a graphical user interface associated with the at least one custom object definition; generating, based on the graphical user interface configuration, at least one third interface, wherein the third interface comprises at least one graphical user interface having the layout; providing, to one or more users, the at least one third interface.

Other aspects of the present disclosure are directed to various systems, apparatuses, non-transitory computer-readable media, user interfaces, and devices for providing no-code and low-code application development and user interface customization. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7B depicts an illustration of a second view of an example user interface for defining a custom data object, custom application, or custom user interface, according to example embodiments of the present disclosure.

FIG. 7C depicts an illustration of a third view of an example user interface for defining a custom data object, custom application, or custom user interface, according to example embodiments of the present disclosure.

FIG. 7F depicts an illustration of a sixth view of an example user interface for defining a custom data object, custom application, or custom user interface, according to example embodiments of the present disclosure.

FIG. 7I depicts an illustration of a ninth view of an example user interface for defining a custom data object, custom application, or custom user interface, according to example embodiments of the present disclosure.

Figure 1:
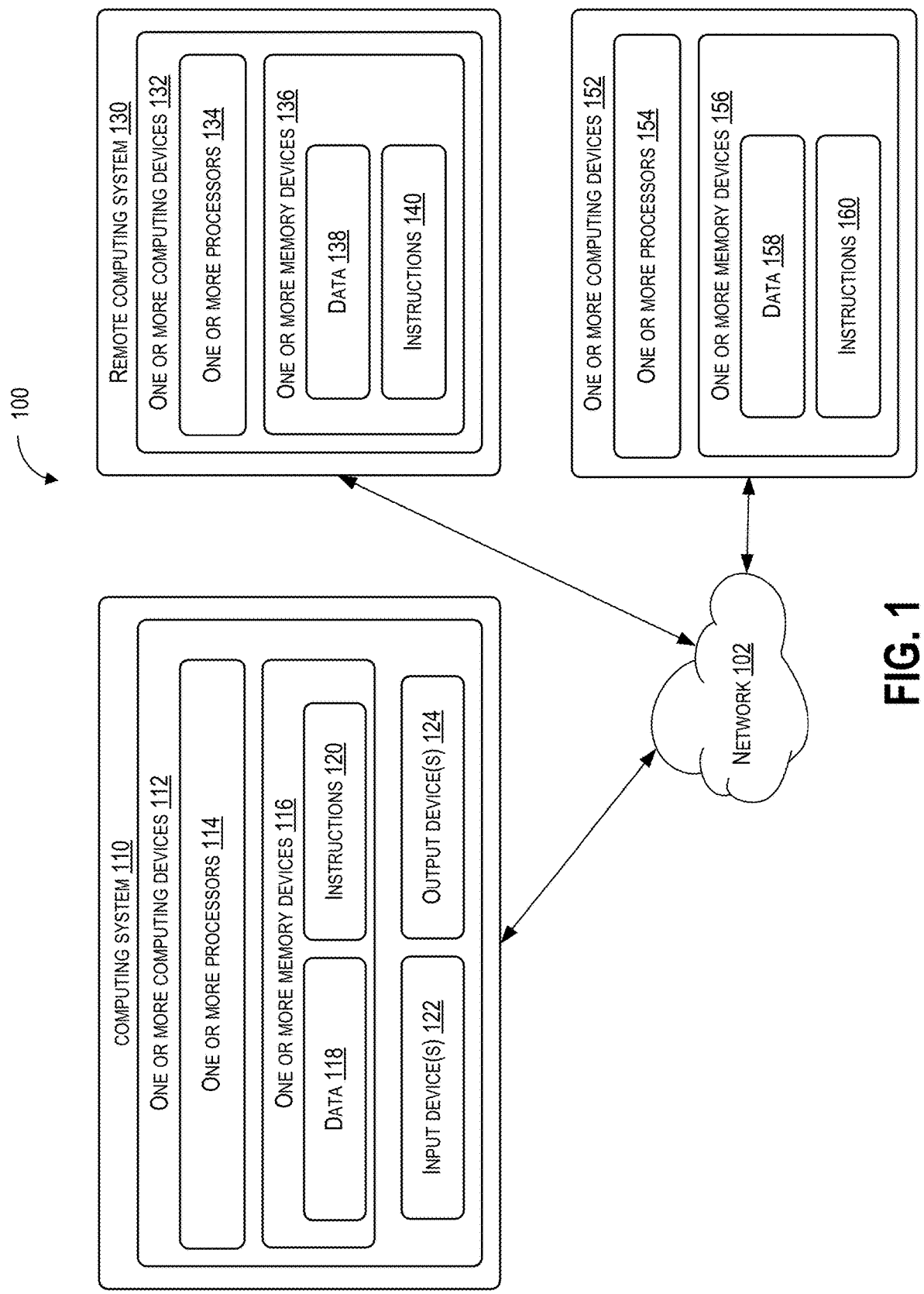
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Generally, the present disclosure is directed to no-code and low-code application development and user interface customization for processing data (e.g., creating, reading, updating, or deleting data records, etc.) associated with user-defined custom objects. In some example embodiments, a user can provide a definition for a custom data object type. The definition can include, for example, a plurality of data fields, with each data field having a field name and field type (e.g., integer, timestamp, date, string, phone number, currency, file attachment, etc.). Based on the custom data object definition, a computing system can automatically generate one or more interfaces (e.g., graphical user interfaces, webhooks, APIs, file upload interfaces, etc.) for creating, reading, updating, and/or deleting a data record corresponding to the custom data object type. Additionally, the computing system can automatically generate one or more interfaces (e.g., no-code graphical user interfaces, etc.) for customizing applications and user interfaces for processing data associated with a custom data object type. For example, a no-code or low-code application development interface can allow a user to define a data processing application without providing any computer code in a computer programming language. As another example, a no-code or low-code graphical user interface (GUI) customization interface can allow a user to define a layout of one or more GUI views (e.g., pages, tabs, etc.) of an application (e.g., user-defined custom application, non-custom application native to an organizational data management platform, etc.) without providing any computer code in a computer programming language.

In some instances, a computing system can provide a no-code graphical user interface for defining a custom data object type. An example graphical user interface can include, for example, one or more text boxes for inputting a field name; one or more dropdown menus or other input components for selecting a field type; and one or more buttons for adding a field to the custom object. An example graphical user interface can also include, for example, input components for defining one or more data validation inputs, which may limit what types of inputs are considered valid inputs according to the custom object definition. Responsive to a user defining a custom data object type through the interface, a computing system can save the custom data object definition in a data structure (e.g., database table, database collection, file, data object, etc.) configured to store one or more custom data object definitions.

In some instances, a computing system can automatically generate, based on a custom data object definition (e.g., received from a user), a plurality of interfaces for adding data records (e.g., database entries, rows, documents, files, etc.) corresponding to the defined custom data object type to a data store (e.g., database, data table, data collection, file, etc.). In some instances, an automatically generated example interface for adding a data record can include an application programming interface (API), such as a Create, Read, Update, and Delete (CRUD) API characterized by a representational state transfer (REST or RESTful) architectural style. In some instances, an automatically generated example interface can include a webhook, which can include an internet address (e.g., URL, etc.) for sending a request (e.g., CRUD request) associated with the custom data object definition. In some instances, an automatically generated example interface can include a mechanism for uploading one or more files (e.g., comma-separated value files, JSON files, BSON files, XML files, etc.) having a plurality of data records associated with the custom data object definition.

In some instances, an automatically generated example interface can include a no-code graphical user interface (e.g., web form, etc.) for creating, reading, updating, or deleting data associated with the custom data object definition. An example graphical user interface for creating or updating data can include, for example, a data input component associated with each field of the custom data object definition. In some instances, each data input component can have a type that may depend on a data type associated with a corresponding field (e.g., text box for string field; calendar input for date field; check box for Boolean field; etc.). An example graphical user interface for reading, updating, or deleting data can include, for example, a data display component (e.g., table, spreadsheet, graph, text display component, etc.) for displaying one or more data records and one or more action components or input components (e.g., buttons, text boxes, etc.) for interacting with the data records (e.g., updating, deleting, etc.).

In some instances, the computing system can generate, based on the custom data object definition, one or more interfaces for defining a custom graphical user interface (GUI) associated with the custom data object. A custom GUI can include, for example, custom GUI components for creating, reading, updating, or deleting data records associated with the custom object type definition. For example, defining a custom GUI component for reading one or more data records can include defining a data filter to determine which data records should be shown to a user of the custom GUI component; selecting one or more fields (e.g., fields of the custom data object, etc.) to display or not display to a user via the custom GUI component; defining a layout of the custom GUI component (e.g., an order of the one or more fields, etc.); and defining other components (e.g., input components such as text boxes; display components; action components such as buttons; navigation components such as hyperlinks; etc.) of the custom GUI being defined. In some instances, a custom GUI for reading data records can comprise one or more GUI components (e.g., buttons, etc.) for updating or deleting the data records being read. Defining a custom GUI for updating or deleting data records can include, for example, defining data to be displayed to a user (e.g., in the same manner as defining a custom GUI for reading data records); defining whether to include an edit option (e.g., edit button) for each data record being displayed; defining whether to include a deletion option (e.g., delete button) for each data record being displayed; and defining any other aspect of the custom GUI for updating or deleting a data record.

In some instances, the computing system can generate, based on the custom data object definition, one or more interfaces (e.g., no-code or low-code graphical user interfaces, etc.) for defining a custom application associated with the custom data object. For example, a user can define a name, logo, system name, permissions data, and other data associated with the custom application as a whole. Additionally, the user can define one or more custom GUI views (e.g., pages, tabs, etc.) to include in the application (e.g., via an interface for defining custom GUI views as described above). In some instances, the user can also select one or more default GUIs to include in the application, such as one or more automatically generated GUIs for creating, reading, updating, or deleting data records associated with the custom object type definition. Example implementation details for example user interfaces for defining custom applications and custom GUIs are further described below with respect to FIGS. 5-7.

Example implementations of the present disclosure can be implemented in the context of or as a portion of an organizational data management platform that controls and leverages organizational data to manage organizational applications such as payroll, operations, human resources (e.g., onboarding and offboarding), benefits, information technology and device management, third-party application integration and access, and many others.

The organizational data management platform can hold, for each of one or more organizations, a centralized set of organizational data that acts as a single, centralized system of record for all organizational management processes for that organization. Each organization can include a number of users which are able to access and interact with the organizational data management platform. Some users may have administrative permissions which define whether the user is able to access and/or modify certain types of organizational data for their organization.

The organizational data for each organization can include data directly entered into the organizational data management platform and/or can include data retrieved, pulled, or otherwise obtained from one or more first party and/or third-party applications with which the organizational data management platform may have varying levels of integration. This ingestion and storage of data from third-party applications is in contrast to systems which simply sit on top of third-party applications and apply rules at run time. In some implementations, the organizational data management platform can provide a user with the ability (e.g., by configuring Simple Mail Transfer Protocol (SMTP) settings) to configure the cadence or periodicity at which the organizational data management platform receives or ingests data (e.g., via .csv files) from third-party applications. Data can be transferred between the organizational data management platform and third-party applications (e.g., to and/or from) using various techniques such as application programming interfaces, data hooks, flat files, bulk uploads/downloads and/or other data transfer mechanisms.

The organizational data can, in some implementations, be held as one or more object databases (e.g., in the form of one or more object graph data structures). For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects (e.g., data objects) and edges that correspond to links or logical associations between objects and/or object attribute(s). Graph(s) can be traversed to understand or leverage relationships among objects (e.g., data objects) and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

In some implementations, the organizational data can include organizational structure data. For example, the organizational structure data can be encoded within links or edges defined between objects (e.g., data objects) of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g., the "work laptops" group of the devices). Organizational structure data may include relationships indicating, for each or a plurality of employees, one or more organizational groups (e.g., roles, departments, project teams, etc.) the employee belongs to.

Example implementations of the present disclosure can leverage a domain-specific query language (e.g., custom query language that is different from a standard query language such as Structured Query Language) that can be used to perform (e.g., in real time) queries against the organizational data. The custom query language can be used to define functions (e.g., operators, formulas, etc.) or queries which return data that satisfies or responds to the functions or queries. In some implementations, the custom query language is a declarative language. In some implementations, the custom query language includes organization functions or operators which leverage organizational relationships within the organizational data. For example, the organization function ORG (employee, relationship) returns one or more other employees that have the specified relationship to the specified employee. In some instances, the custom query language can include one or more formula functions (e.g., sum, average, standard deviation, count, etc.). In some instances, a data record or object defined in the custom query language can include a formula field, which can be automatically determined based on a formula comprising one or more other fields (e.g., employee's revenue total can be a sum of project revenues for all projects associated with employee, etc.). In some instances, an organizational data management platform can be configured so that formula fields can be automatically updated responsive to updates to one or more fields or other data the formula depends on. Such an automatic update can occur immediately after each update to the other data or fields, or can occur periodically (e.g., once per day, hour, week, etc.).

According to an aspect of the present disclosure, the custom query language can be incorporated into reports, policies, triggering, data management, and/or workflows. For example, a user-constructed query in the custom query language can be used for intelligently facilitating various downstream operations, for example, by reference/query to an employee or organizational chart.

In one example, the custom query language can allow for the creation of "calculated fields" which can be data fields which are or act as a function of a custom query language script and can be propagated to or referenced by other reports, policies, triggering, data management, and/or workflows.

In other examples, custom query language expressions can underlie or be included in predefined reports, policies, triggering, data management, and/or workflows. These predefined items can be visible and modifiable by the user (e.g., in raw query expression form or via a wizard user interface). For example, in a wizard user interface, objects or functions can be automatically populated and/or suggested.

The systems, methods, and computer program products described herein provide a number of technical effects and benefits. For example, some embodiments of the present disclosure can provide better scaling for large amounts of data compared to alternative systems and methods (e.g., alternative organizational data management platforms, etc.). For example, some embodiments of the present disclosure can provide SQL-like or relational-database-like functionality in a noSQL data storage format (e.g., MongoDB document store, etc.), which can in some instances be more scalable than a similar relational database. Additionally, some embodiments can include a language-agnostic or database-agnostic custom query language, which can act as a wrapper for a lower-level data storage system or application. In this manner, for instance, obsolete or legacy data storage systems can be substituted out, and more efficient or scalable new data storage systems can be substituted in as they become available, thereby increasing an efficiency of a computing system itself. As another example, some embodiments of the present disclosure can provide better performance (e.g., lower latency, higher throughput, reduced processing power, reduced memory usage, etc.) compared to alternative systems and methods. For example, some embodiments of the present disclosure can provide asynchronous bulk updates in a noSQL format, which can be associated with lower latency, higher throughput, and lower cost compared to alternate systems and methods for updating a large number of data records. Additionally, systems and methods of the present disclosure can provide query planning and data retrieval optimization tools for systems (e.g., noSQL document stores, etc.) that may otherwise lack robust data retrieval optimization tools. In this manner, for instance, a cost of creating, reading, updating, and deleting data records can be reduced, thereby improving the functioning of a computing system itself.

As another example, the embodiments described in the present disclosure provide no-code application development and user interface customization, for example, more efficiently and with fewer computing resources (e.g., less processing power, less memory usage, less power consumption, etc.), than would otherwise be wasted by maintaining custom, proprietary, and/or manual processes. For example, some embodiments of the present disclosure can provide multiple interfaces, including a plurality of default graphical user interfaces, specific to a new custom data object, while only adding a definition of the custom data object in computer memory or disk space. In some instances, additional graphical user interfaces can be provided while only storing a configuration or definition of the additional graphical user interfaces in computer memory or disk space. In some instances, a custom data object definition or graphical user interface definition can be stored using less than one kilobyte of space. In contrast, alternative systems and methods for providing a plurality of graphical user interfaces for a particular custom object may require separately creating (e.g., by a computer programmer, which can be a labor-intensive process) and storing substantial amounts of computer code for each custom interface associated with each custom data object. In this manner, for instance, example embodiments can provide no-code application development and user interface customization at a reduced computational cost (e.g., reduced memory cost) compared to alternative methods.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, one or more computing devices 152, etc.) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with no-code application development and user interface customization across various types of applications and/or computer systems. Further, the one or more memory devices 116 can store the data 118 and/or the instructions 120, which can be executed by the one or more processors 114 to cause the one or more computing devices 112 to perform one or more operations.

In one example embodiment, the one or more operations that can be performed by the one or more processors 114 can include, but are not limited to: providing one or more first interfaces for defining one or more custom objects; receiving, via the one or more first interfaces, at least one custom object definition comprising one or more data fields; automatically generating, based on the at least one custom object definition, one or more second interfaces for configuring one or more graphical user interfaces; receiving, via the one or more second interfaces, at least one graphical user interface configuration defining a layout for a graphical user interface associated with the at least one custom object definition; generating, based on the graphical user interface configuration, at least one third interface, wherein the third interface comprises at least one graphical user interface having the layout; and providing, to one or more users, the at least one third interface.

In another example embodiment, the one or more operations that can be performed by the one or more processors 114 can include any operation discussed below with respect to FIGS. 4-8.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), data that includes instructions in a custom computer language (e.g., the above-described custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing triggers based on one-to-many and/or many-to-one relationships between entities and/or data objects in a system of record) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, application object data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), application object data, and/or other types of data.

Figure 2:
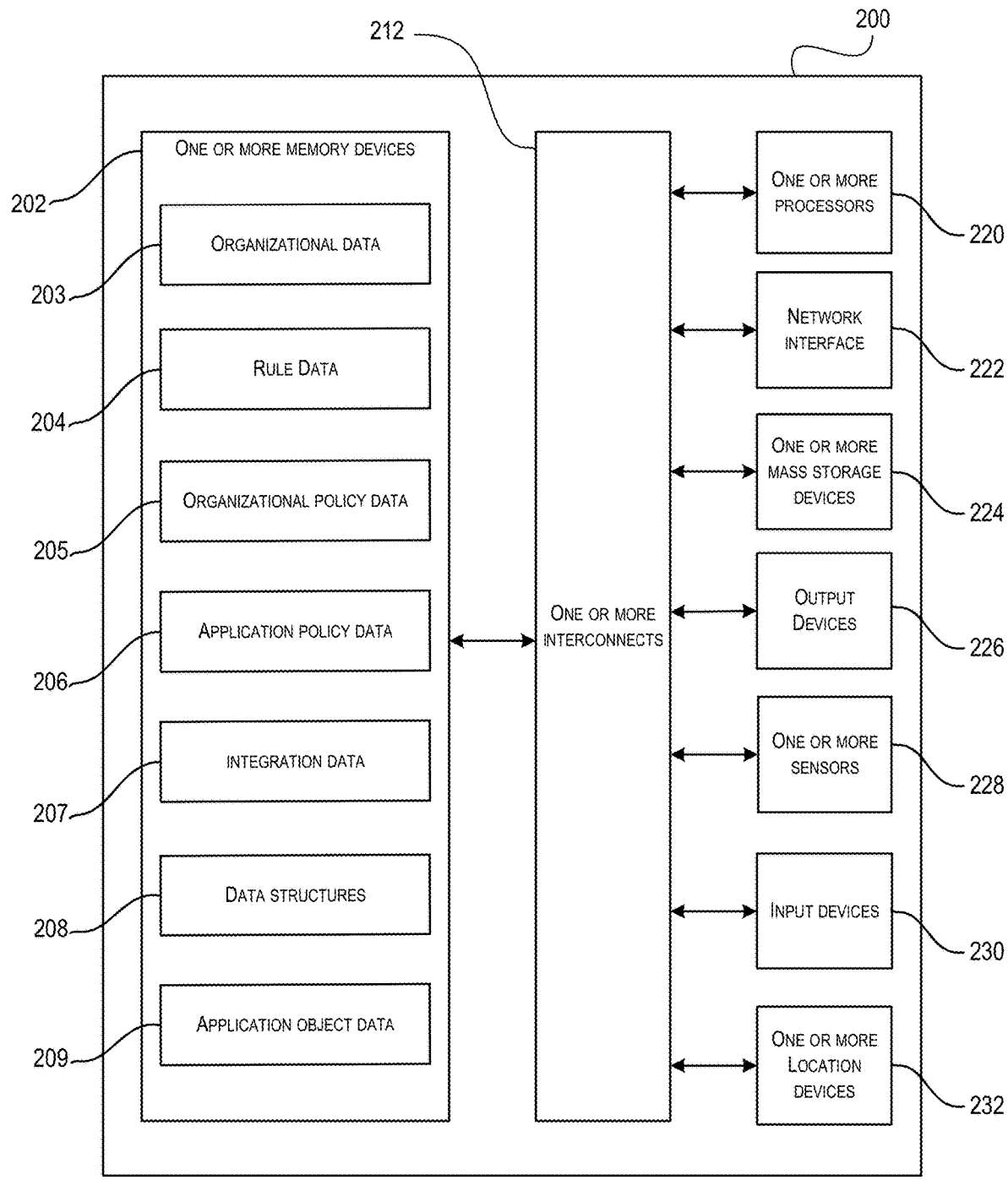
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, application object data 209, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, application object data 209, and/or any other types of data). Further, the one or more memory devices 202 can include one or more non-transitory computer-readable storage media, including RAM, ROM, EEPROM, EPROM, flash memory devices, magnetic disks, and any combination thereof.

In one example embodiment, the information and/or data that can be stored by the one or more memory devices 202 can be executed by the one or more processors 220 to cause the computing device 200 to perform one or more operations associated with receiving a custom object definition via one or more interfaces (e.g., as described below with respect to FIG. 4).

In another example embodiment, the information and/or data that can be stored by the one or more memory devices 202 can be executed by the one or more processors 220 to cause the computing device 200 to perform one or more operations associated with defining a custom application or custom graphical user interface associated with one or more custom data objects (e.g., as described below with respect to FIGS. 5-7).

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). The rule data 204 also can include one or more rules associated with implementing and/or utilizing a custom computer language, such as a custom computer language (e.g., the above-described custom query language) for performing operations associated with organizational data 203. In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1) which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example: to obtain information from one or more applications (e.g., third party and/or other applications); to perform operations involving organizational data (e.g., organizational data 203) in the organizational data management system; to synchronize organizational data across one or more applications; to perform one or more actions involving the applications based on organizational data in the organizational data management system; and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing, for example: one or more entities (e.g., objects (e.g., data objects), records, etc.); one or more relationships involving the one or more entities (e.g., relationships between entities); one or more data values associated with each of the one or more entities and/or the one or more relationships; one or more functions and/or operations that may be applied to each of the one or more entities and/or the one or more relationships; and/or any other data or metadata describing or otherwise defining structure and/or rules associated with the one or more entities and/or the one or more relationships.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors, etc.), departments, teams, roles, groups, locations, offices, documents, tasks, reports, accounts, devices, applications, end-user applications, licenses, workflows, alerts, and/or any other type of entity representing or related to managing organizational data (e.g., organizational data 203).

The data structures 208 also can define various relationships among the various entities associated with organizational data. For example, the data structures 208 may define and be used to enforce relationships such as, for instance: each employee must be assigned to a department; each employee can be included on one or more teams; each employee must be assigned to a primary location; each employee may be assigned to one or more secondary locations; employees may have one or more computing devices; each vendor must have a current audit; each independent contractor must be associated with a contract; and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs (e.g., based on an object graph data model) providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, entity attributes, entity attribute categories, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The application object data 209 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application object data 209 generally can include any information used to implement any particular type of application object or associated data structure that stores, references, utilizes, and/or processes data (e.g., organizational data 203). For example, such types of application objects generally may include, but are not limited to, application triggers, reports, workflows, tasks, custom application objects, and/or any other types of objects used to store and/or process data in a system of record, such as an organizational data management system. Further, application object data 209 that can be used to implement any particular type of application object or associated data structure may include, but is not limited to: instructions in a computer language (e.g., a custom computer language provided by an organizational data management system for managing organizational data 203); metadata associated with application objects or related data structures; data associated with one or more particular instances of application objects or related data structures; data associated with configuration of one or more application objects or related data structures; and/or other data that can be used to implement any particular type of application object or associated data structure. In some embodiments, the application object data 209 can be received from one or more computing systems (e.g., the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, application object data 209, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further, the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, the application object data 209, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, the application object data 209, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
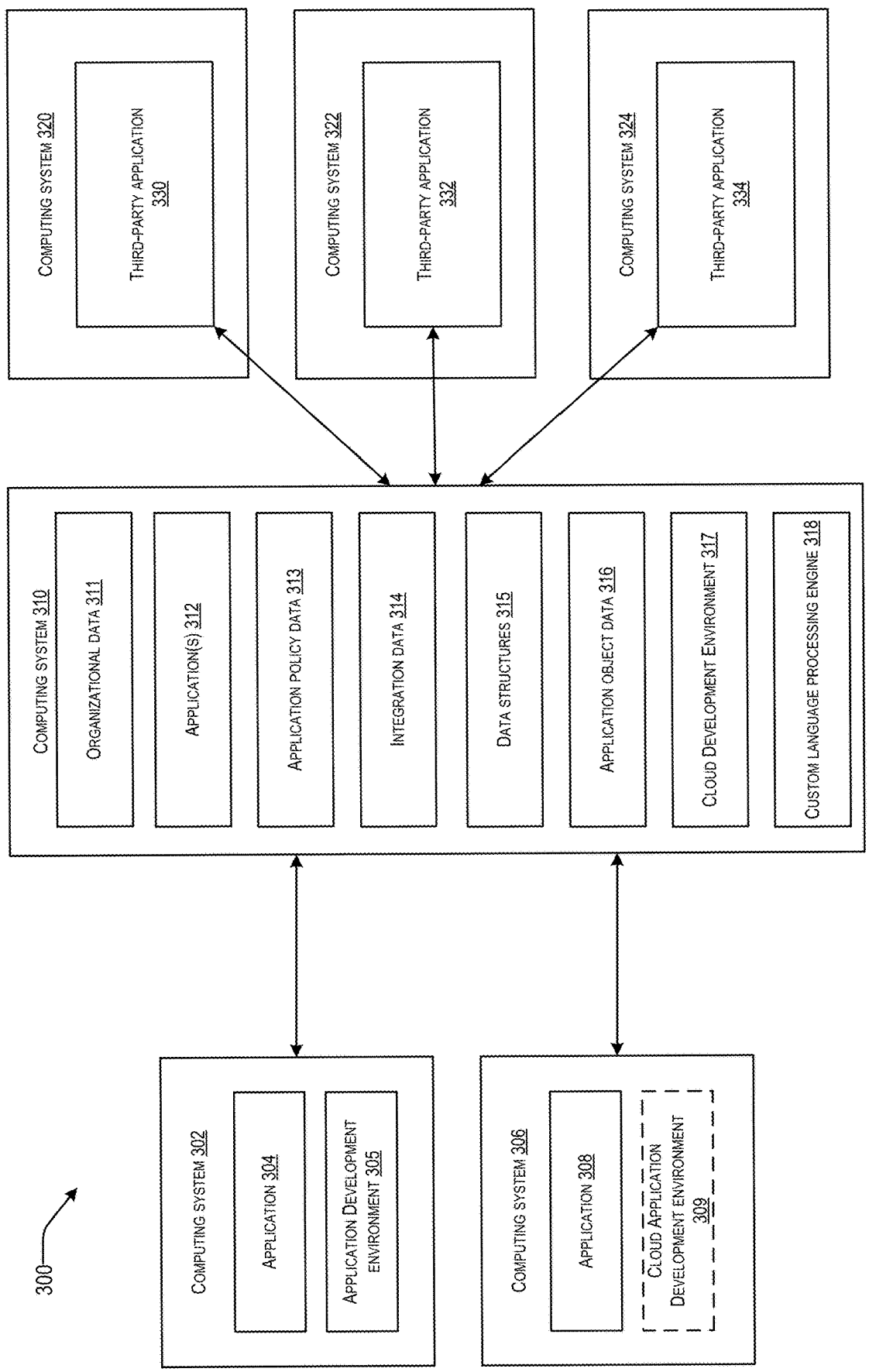
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, computing system 310, computing system 320, computing system 322, or computing system 324 can include one or more attributes and/or capabilities of the computing system 110, the remote computing system 130, the one or more computing devices 152, and/or the computing device 200. Furthermore, any of the computing system 302, the computing system 306, the computing system 310, the computing system 320, the computing system 322, or the computing system 324 can be configured to perform one or more operations and/or one or more actions that can be performed by the computing system 110, the remote computing system 130, the one or more computing devices 152, and/or the computing device 200.

As shown in FIG. 3, the example computing environment 300 includes the computing system 302, an application 304, an application development environment 305, the computing system 306, an application 308, a cloud application development environment 309, the computing system 310, organizational data 311 (e.g., organizational data 203), one or more application(s) 312, an application policy data 313, integration data 314, data structures 315, application object data 316, a cloud development environment 317, a custom language processing engine 318, the computing system 320, the computing system 322, the computing system 324, a third-party application 330, a third-party application 332, and a third-party application 334.

In an embodiment, the computing system 302, the computing system 306, the computing system 310, the computing system 320, the computing system 322, and/or the computing system(s) 324 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with the computing system 302, the computing system 306, and/or the computing system 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language (e.g., a custom query language) generally may provide users with a simplified set of computer instructions that align with or match a user's understanding of a functional or business environment, such as an organization, business, industry, sector, and/or another functional or business environment. In some embodiments, each of such one or more custom computer languages is a user language that allows users with a basic understanding of, for instance, a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggers, and/or other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311.

In an embodiment, a custom computer language may allow a user to use simplified terms to query organizational data 311. In one example, a custom computer language may allow a user to obtain the name of an employee's manager with the following example query: "ORG (John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language (e.g., a custom query language) includes a function that reports quantile information based on employee information or any other type of organizational data. For example, such a function generally may be labeled as a "quantile" function, as a "percentile" function, or given any other type of label or name. The following examples generally refer to the function name as "quantile" for illustration purposes only.

In an example, a "quantile" function of a custom query language generally may return a particular quantile (e.g., decile, percentile, etc.) of organizational data (e.g., an employee, a department, etc.) in comparison to other corresponding organizational data (e.g., other employees, other departments, etc.). In one example, a "quantile" function call in a custom query language may take four arguments. For example, a first example argument of the "quantile" function may specify a particular instance of organizational data 311 such as a particular employee, a particular department, a particular contractor, a particular vendor, or any other particular instance of organizational data 311. A second example argument of the "quantile" function may specify a numeric attribute value, a derived value, or a calculated value for comparison. A third example argument of the "quantile" function may specify a logical condition that evaluates to "true" or "false" for corresponding organizational data (e.g., other employees, other departments, etc.) where the corresponding organizational data that evaluates to "true" is included when calculating quantile information. As such, corresponding organizational data that evaluates to "false" would not be included when calculating quantile information. A fourth example argument of the "quantile" function may specify a particular quantile to use for analysis. For example, the example fourth argument may specify a numeric value representing a number of buckets to use for calculating a particular quantile (e.g., the value "4" for quartiles, the value "5" for quintiles, the value "10" for deciles, the value "100" for percentiles and/or any other value for calculating a particular, specialized quantile associated with organizational data 311). The example fourth argument also could take text input indicating a particular type of quantile to utilize (e.g., "quartile", "quintile", "decile", "percentile", etc.) and is not limited to numeric values.

In one example, a signature of an example "quantile" function of a custom computer language (e.g., a custom query language) generally can be defined and/or appear as "QUANTILE({employee_information}, {attribute_value_to_compare}, {logical_condition, quantile_type})". For example, an example call to the "quantile" function of the custom query language generally may be invoked based on the following example custom query language statement: "QUANTILE("Denise Smith", compensation, level=$level, 10). In the example quantile function call, the first example argument specifies the name of a particular employee or individual. Other values, such as a unique employee identifier, unique contractor identifier, and/or any other type of unique identifier of a particular instance of organizational data may be utilized (e.g., unique department name, unique department id, etc.).

The second example argument in the example quantile function call indicates compensation as the attribute of the specified employee (i.e., "Denise Smith") to be compared. Also, any derived or calculated values, such as "TODAY ( )—employee_start_date" (e.g., which calculates an employee's length of employment) may be utilized. The third example argument in the example quantile function call indicates a logical condition where the level of other employees "level" is equal "=" to the level of "Denise Smith" "$level". As such, employees at the same level as "Denise Smith" in an organizational data management system as indicated by the organizational data will be included in the QUANTILE determination of the current example. The fourth example argument in the example quantile function call "10" indicates that 10 quantiles (i.e., "deciles") are to be used in the calculation of determining how "Denise Smith's" "compensation" compares to other employees at the same level (i.e., "level=$level"). Thus, "Denise Smith" may fall into any one of 10 buckets depending on how her "compensation" compares to other employees in an organization based on organizational data 311.

The example QUANTILE function generally can return the number of the particular, specified quantile (e.g., the bucket number) based on a determination. Continuing with the current example, if "Denise Smith" had "compensation" that ranked in the top ten percent of employees at the same level (i.e., "level=$level") then "10" would be returned as the determined decile bucket of the example quantile function (or, for example if quartiles were specified instead of deciles, then "4" would be returned). Similarly, if the "compensation" of "Denise Smith" ranked last in the determination, then a "1" would be returned as the determined decile bucket of the example quantile function ("1" also would be returned if quartiles were specified instead of quintiles). In an additional example, a custom query language statement: "QUANTILE("Denise Smith", equity_grant, start_date<$start_date+90 and start_date>$start_date−90 and equity_grant>0, 100) returns "Denise Smith's" "equity grant" decile in comparison to other employees with start dates within 90 days of "Denise Smith's" start date where those employees have equity grants.

In an embodiment, a custom computer language is based on and/or otherwise associated with one or more data structures 315 associated with an application. For example, a custom computer language may be based on, represent, describe, or otherwise be associated with an object graph data structure (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures. In various embodiments, an application (e.g., one of application 312) and/or another supporting application used in association with the application can utilize one or more data structures 315 including, for instance, one or more object graph data structures to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the application development environment 305 may run, for example, on a computing system (e.g., computing system 302) and/or in association with information, applications, and/or services on another computing system (e.g., computing system 310). For example, application development environment 305 may utilize organizational data 311, application(s) 312, application policy data 313, integration data 314, data structures 315, and/or application object data 316 available from another computing system (e.g., computing system 310, one or more computing systems associated with an organizational data management system, etc.). In at least one embodiment of the present disclosure, application development environment 305 can include specialized computer software for performing operations associated with providing and/or implementing triggers based on one-to-many and/or many-to-one relationships between entities and/or data objects in a system of record, where such specialized computer software and/or such operations associated with providing and/or implementing such triggers can be based on computer instructions in a custom computer language provided by the system of record. For example, in one embodiment, application development environment 305 also can include a query processing engine (not shown), computer instruction compiler (not shown), computer instruction generator (not shown), and/or other specialized computer software for performing operations associated with providing and/or implementing triggers based on one-to-many and/or many-to-one relationships between entities and/or data objects in a system of record (e.g., where such specialized computer software and/or such operations associated with providing and/or implementing such triggers can be based on computer instructions in a custom computer language provided by the system of record). Application development environment 305 also may utilize or work in conjunction with, in whole or in part, cloud development environment 317 and custom language processing engine 318 (e.g., including, for instance, any computer instruction compiler (not shown) and/or computer instruction generator (not shown) associated with custom language processing engine 318), and/or other features and/or operations available from another computing system (e.g., computing system 310, one or more computing systems associated with an organizational data management system, etc.).

In an embodiment, application development environment 305 can include an editor that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide: syntax highlighting in a custom computer language; intelligent completion of keywords or statements in a custom computer language; automated hints and examples; various types of pop-up information to assist a user in writing or editing instructions in a custom language; visual notification of syntax or other errors; suggested correction of syntax or other errors; automatic suggestion and/or population of objects and/or functions; and/or other assistance with constructing various types of statements in a custom computer language. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, application development environment 305 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide drop-down lists, enhanced browsing, and other visual access to features and operations of a custom computer language, and/or one or more data structures 315 associated with a custom computer language or related application to construct, edit, and/or otherwise utilize instructions in a custom computer language. In some examples, the application development environment 305 may provide a textual editor in combination with the visual editor to allow users to view, utilize, and alternate between both textual and visual editors of a custom query language, for example, as part of the same user interface. In some examples, application development environment 305 can parse and perform various operations involving instructions in a custom computer language alone or in association with another computing system (e.g., based on various data and/or services provided by computing system 310).

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect one or more events that can include, but are not limited to, for instance: when an employee receives a promotion or a raise; changes to a different department; is added to one or more new teams; is assigned new computer hardware or other equipment; and/or another event associated with the employee and/or another entity and/or data object of an organization.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating, and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be a local instance of an online integrated development environment (e.g., a cloud development environment 317) provided by a computing system (e.g., computing system 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the cloud application development environment 309 may run, for example, on a computing system (e.g., computing system 306) and/or in association with information, applications, and/or services on another computing system (e.g., computing system 310). For example, cloud application development environment 309 may utilize organizational data 311, application(s) 312, application policy data 313, integration data 314, data structures 315 and/or application object data 316 available from another computing system (e.g., computing system 310, one or more computing systems associated with an organizational data management system, etc.). In at least one embodiment of the present disclosure, cloud application development environment 309 can include specialized computer software for performing operations associated with providing and/or implementing triggers based on one-to-many and/or many-to-one relationships between entities and/or data objects in a system of record, where such specialized computer software and/or such operations associated with providing and/or implementing such triggers can be based on computer instructions in a custom computer language provided by the system of record. For example, in one embodiment, cloud application development environment 309 also can include a query processing engine (not shown), computer instruction compiler (not shown), computer instruction generator (not shown), and/or other specialized computer software for performing operations associated with providing and/or implementing triggers based on one-to-many and/or many-to-one relationships between entities and/or data objects in a system of record (e.g., where such specialized computer software and/or such operations associated with providing and/or implementing such triggers can be based on computer instructions in a custom computer language provided by the system of record). Cloud application development environment 309 also may utilize or work in conjunction with, in whole or in part, cloud development environment 317 and custom language processing engine 318 (e.g., including, for instance, any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide: syntax highlighting in a custom computer language; intelligent completion of keywords or statements in a custom computer language; automated hints and examples; various types of pop-up information to assist a user in writing or editing instructions in a custom language; visual notification of syntax or other errors; suggested correction of syntax or other errors; automatic suggestion and/or population of objects and/or functions; and/or other assistance with constructing various types of statements in a custom computer language. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls, and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications and/or one or more third-party applications are accessed, modified, configured, and/or controlled. For instance, in these or other embodiments, the application policy data 313 can determine how one or more applications owned and controlled by an organization that owns and controls the organizational data 311 and/or applications provided with or as part of an organizational data management system used by the organization as a system of record for maintaining the organizational data 311 are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing system 302, computing system 306, and computing system 310) and/or applications (e.g., such as application 304, application 308, and application(s) 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, application 308, etc.) that use or perform operations based on the organizational data 311). In some embodiments, such integration data 314 may include, but is not limited to, information indicating and/or describing various data that enables performance of an integration between applications or systems such as, for instance: an integration type information (e.g., flat file, application programming interface or "API", webhook, system call, etc.); security information (e.g., authentication information, encryption information, etc.); technical information (e.g., file locations, call information, system naming, application naming, IP address information, port information, etc.); integration flow information (e.g., push, pull, bidirectional, etc.); integration activation (e.g., scheduling or timing information, event information, one or more rules, one or more triggers or criteria, etc.); processing information (e.g., data mappings between the source and target, data validation rules, data transformations, error handling, etc.); and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, for instance: performing integration and synchronization of the organizational data 311 with one or more different third-party applications and/or systems; generating and processing computer instructions across one or more different systems based on the organizational data 311; and/or another operation involving the organizational data 311. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating computer instructions, processing computer instructions, generating workflows, executing workflows, generating triggers, evaluating trigger conditions, performing trigger operations, creating reports, running reports, and/or another operation involving the organizational data 311.

In an embodiment, the data structures 315 can include one or more object graphs and/or any other types of data structures that provide information about entities, relationships, rules, constraints, and/or any other aspects of managing the organizational data 311. For example, such object graphs and/or data structures can include one or more nodes (e.g., data objects) representing entities associated with the organizational data 311 and one or more edges that connect and represent relationships between the nodes (e.g., explicit edges defining relationships between entities and data, virtual edges inferring relationships between entities and data, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support various operations performed by a system of record including, but not limited to, performing one or more operations for providing and/or implementing triggers based on one-to-many and/or many-to-one relationships between entities and/or data objects in the system of record. For example, the data structures 315 alone or in combination with configuration data and/or one or more other types of information may be used to generate new instructions in a computer language, which may include a custom computer language provided to users. Further, such new instructions generally may include one or more operations (e.g., one or more underlying data joins) that are identified and included in the generated instructions based on analyzing instructions received in the custom computer language in view of the data structures 315.

The computing system 310 includes the application object data 316, which can be implemented on the computing system 310. For example, the application object data 316 can include any information that is used to implement any type of application object or data structure for an application object that may store, reference, utilize, and/or process data. In an example, a system of record generally may support application objects that include, but are not limited to, application triggers, application reports, application workflows, application tasks, custom objects, and/or any other type of object.

In an embodiment, application triggers generally may include application objects that are referenced based on an event. For example, an application trigger may be referenced: based on (e.g., in response to) one or more internal application or system events (e.g., occurring within a system of record, etc.); based on (e.g., in response to) one or more external application or system events (e.g., occurring outside of a system of record, occurring in a third-party application integrated with a system of record, etc.); based on (e.g., in response to) a combination of one or more internal application or system events and one or more external application or system events; and/or based on (e.g., in response to) another event.

Generally, an application trigger may include one or more conditions to be evaluated when the application trigger is referenced by an application or system. For example, such conditions may include, but are not limited to, conditional statements that test one or more aspects of organizational data 311. In one example, when the application trigger is referenced and the conditions of the application trigger are satisfied (e.g., evaluate to true), then one or more operations associated with the trigger are automatically executed. For example, the one or more operations associated with the application trigger may cause an application or system to perform one or more operations internally, may cause the application or system to perform one or more operations in association with an external application or system (e.g., based on an integration, etc.), or may cause the application or system to perform one or more operations internally and to perform one or more operations with an external application or system.

In at least one embodiment of the present disclosure, the application trigger can include a one-to-many operator that associates a first entity and/or data object with multiple second entities and/or data objects, where the application trigger can be defined based at least in part on the one-to-many operator and a custom computer language supported by, for instance, application 304, application 308, one or more applications 312, and/or another application of example computing environment 300. For example, in this or another embodiment, the application trigger can include a one-to-many operator that associates a first node of data structures 315 that represents a first entity of an organization in organizational data 311 with multiple second nodes of data structures 315 that represent multiple second entities of the organization in organizational data 311, where the application trigger can be defined based at least in part on the one-to-many operator and a custom computer language supported by, for instance, application 304, application 308, one or more applications 312, and/or another application of example computing environment 300.

In at least one other embodiment of the present disclosure, the application trigger can include a many-to-one operator that associates multiple first entities and/or data objects with a second entity and/or data object, where the application trigger can be defined based at least in part on the many-to-one operator and a custom computer language supported by, for instance, application 304, application 308, one or more applications 312, and/or another application of example computing environment 300. For example, in this or another embodiment, the application trigger can include a many-to-one operator that associates multiple first nodes of data structures 315 that represent multiple first entities of an organization in organizational data 311 with a second node of data structures 315 that represents a second entity of the organization in organizational data 311, where the application trigger can be defined based at least in part on the many-to-one operator and a custom computer language supported by, for instance, application 304, application 308, one or more applications 312, and/or another application of example computing environment 300.

In an embodiment, application reports generally may include any computer instructions that are executed by an application or system to obtain a collection of data or the resulting collection of data. Application workflows generally may refer to an object or objects that define a sequence of steps for automating a process associated with an application or system. Application tasks generally may be objects that are used to define one or more actions or pieces of work to be performed by a user or group of users. Application tasks may be assigned or delegated to one or more users or groups of users. Application tasks also may include information related to a particular task (e.g., start date, due date, etc.). Applications and systems may allow a user of an organization to create custom objects, which may define one or more custom object attributes, custom object operations, and relationships with entities provided by an application or system and/or other custom objects defined for an organization.

The computing system 310 includes the cloud development environment 317, which can be implemented on the computing system 310, for example, to provide users with access to an environment for writing, building, testing, executing, and/or performing any other types of operations involving instructions in a custom computer language. In an embodiment, the cloud development environment 317 may include and/or perform operations associated with the custom language processing engine 318 and, for example, any computer instruction compiler (not shown) and/or any computer instruction generator (not shown) associated with custom language processing engine 318. In addition, the cloud development environment 317 may run on one computing system (e.g., computing system 310) and provide one or more services to applications running on another computing system (e.g., application development environment 305 on computing system 302, cloud application development environment 309 on computing system 306, etc.). Further, the cloud development environment 317 may perform any one or more of the operations previously described with respect to application development environment 305 and/or cloud application development environment 309. Similarly, application development environment 305 and/or cloud application development environment 309 may perform any one or more of the operations described in association with cloud development environment 317.

The computing system 310 includes the custom language processing engine 318, which can be implemented on the computing system 310 and used to perform operations associated with processing requests based on instructions in a custom computer language. In various embodiments, the custom language processing engine 318 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 317, etc.). Custom language processing engine 318 may be associated with or utilize one or more computer instruction compilers (not shown) and/or one or more computer instruction generators (not shown), which for example, may be separate, part of, or integrated with the custom language processing engine 318.

In an embodiment, a computer instruction compiler of the custom language processing engine 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315 to, for example: determine whether any error exists in the custom computer language instructions; identify one or more errors in the custom computer language instructions; return information about one or more of the identified errors; determine when the custom computer language instructions are free from error; and/or to complete another operation. The computer instruction compiler of the custom language processing engine 318 may include or be associated with a computer instruction generator (not shown) that generates one or more new instructions in a computer language, such as a custom computer language.

In an embodiment, a computer instruction generator of the custom language processing engine 318, can be implemented on the computing system 310 and used to generate one or more new instructions in a custom computer language. For example, the computer instruction generator may generate instructions in a custom computer language for execution based on configuration of one or more application objects and/or data associated with such application objects (e.g., application triggers, application reports, application workflows, application tasks, custom objects, etc.). In one example, such instructions in the custom computer language may be executed by an application of a system of record to perform one or more operations involving the system of record and/or any third-party application integrated with the system of record. In one example, the computer instruction generator may generate instructions in any computer language, for example, to be executed in association with any application or computing system. For example, the computer instruction generator may generate instructions in a different computer language for execution with one or more other applications 312 or data stores (not shown) on or associated with computing system 310 and/or one or more other applications (e.g., application 304, application 308, third-party application 330, third-party application 332, third-party application 334) associated with other computing systems (e.g., computing system 302, computing system 306, computing system 320, computing system 322, computing system 324).

In various examples, third-party applications (e.g., third-party application 330, third-party application 332, third-party application 334) generally may be any type of computer application referenced within the present disclosure or otherwise available. In some examples, each third-party application may be associated with a respective computing system (e.g., computing system 320, computing system 322, computing system 324). In some examples, each third-party application may be associated with one or more different computing systems. In some examples, multiple third-party applications may run on each of one or more different computing systems.

In an embodiment, an application store computing system (not shown) provides an organization with access to multiple different integration applications (not shown) for integrating organizational data 311 and/or associated processes with and across various applications and/or systems (e.g., application(s) 312, third-party application 330, third-party application 332, third-party application 334, etc.). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., and not end-user versions of applications that would be installed for general purpose use by end-users on end-user devices or for use by end-users via cloud services or any other types of services).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications available for use by end users) provided to particular individuals, groups, and/or one or more devices associated with such individuals or groups in the organization (e.g., via installation on respective user devices, via a cloud application service available to end users, etc.).

In an embodiment, one or more of the integration applications can provide integration of organizational data 311 and associated services with one or more corresponding third-party applications (e.g., application 304 on computing system 302, application 308 on computing system 306, application(s) 312 on computing system 310, third-party application 330 on computing system 320, third-party application 332 on computing system 322, third-party application 334 on computing system 324, etc.) that utilize and/or perform operations based on organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, and/or other charitable services.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from and/or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflows, triggers, tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application(s) 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. In one or more additional and/or alternative embodiments, any such user with the appropriate privileges may configure integration data 314 associated with each of one or more integration applications. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize organizational data 311, that perform processing involving or based on organizational data 311, and/or that are otherwise associated with organizational data 311. The organizational data management system also can automate various processing based on the organizational data 311 including, but not limited to, the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party application 330, third-party application 332, third-party application 334, etc.) that generate, utilize, process, and/or perform activities based on organizational data 311. Such integration generally allows an organizational data management system to orchestrate and automate processing of organizational data 311 and associated activities across numerous different applications that are not in communication or coordination with one another. In some embodiments, an organizational data management system can allow appropriate users (e.g., authenticated, authorized, privileged, etc.) of an organization to manage, for example, organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. In one or more additional and/or alternative embodiments, an organizational data management system can comprise any one or more of organizational data 311, application(s) 312, application policy data 313, integration data 314, data structures 315, application object data 316, cloud development environment 317, custom language processing engine 318, and/or any other information associated with managing, processing, and performing activities associated with organizational data 311. In addition, an organizational data management system may provide and utilize its own custom computer language that allows users to access and perform various operations using simplified computer instructions based on structure of organizational data 311. Further, an organizational data management system may provide various features and user interfaces to configure and to automate the execution of triggers in the custom computer language to perform various activities within the organizational data management system and across one or more other applications (e.g., third-party application 330, third-party application 332, third-party application 334, etc.) running on one or more different computing systems (e.g., computing system 320, computing system 322, computing system 324, etc.).

In one example, the above-described features and user interfaces can allow a user to configure one or more conditions and one or more operations of a trigger using a one-to-many operator of the custom computer language to define the trigger based on a one-to-many relationship between a first entity and/or data object (e.g., a first node of data structures 315) and multiple second entities and/or data objects (e.g., multiple second nodes of data structures 315) of organizational data 311. In another example, such features and user interfaces can allow a user to configure one or more conditions and one or more operations of a trigger using a many-to-one operator of the custom computer language to define the trigger based on a many-to-one relationship between multiple first entities and/or data objects (e.g., multiple first nodes of data structures 315) and a second entity and/or data object (e.g., a second node of data structures 315) of organizational data 311.

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more of organizational data 311, application(s) 312, application policy data 313, integration data 314, data structures 315, application object data 316, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

Figure 4:
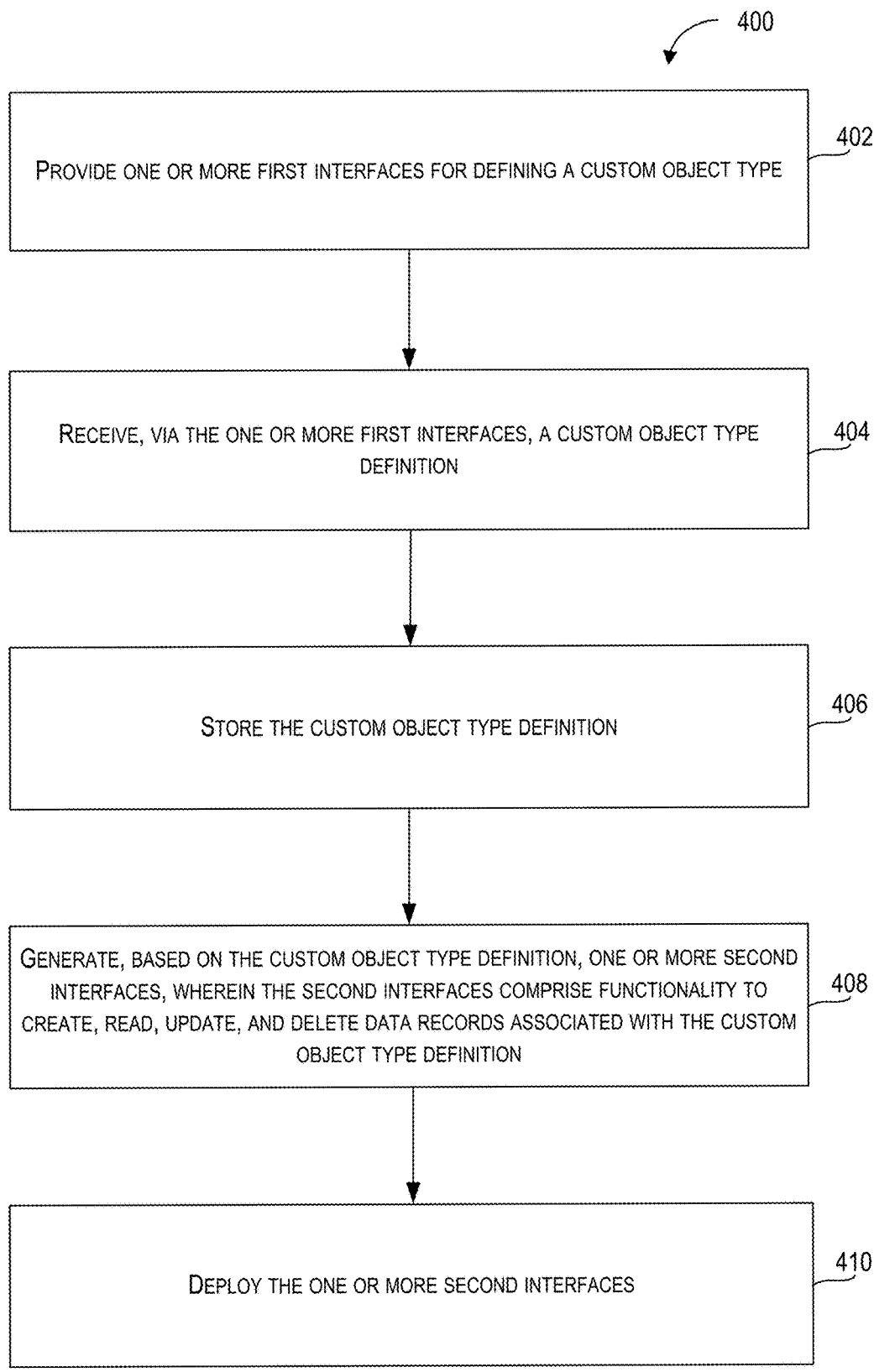
FIG. 4 depicts a flow diagram of an example method for receiving custom object definitions, according to example embodiments of the present disclosure.

FIG. 4 depicts a flow diagram of an example method 400 for automatically generating custom data interfaces based on custom object definitions, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 402, a computer system (e.g., computing system 110, computing system 310, etc.) provides one or more first interfaces for defining a custom object type. In some embodiments, the one or more first interfaces can include a graphical user interface (GUI) for defining a custom object type. In some instances, a GUI can include a no-code interface for defining a custom object type without inputting any computer code. In some embodiments, the one or more first interfaces can include an interface for inputting a custom object definition query in a custom query language (e.g., Rippling Query Language). In some embodiments, the one or more first interfaces can include an API, a webhook, a file upload interface (e.g., for uploading custom object definitions in a JSON, XML, BSON, or other structured data format, etc.), or any other appropriate interface type.

A GUI for inputting a custom object definition can include, for example, a navigation component (e.g., button, hyperlink, etc.) configured to open a display component (e.g., window, frame, etc.) for inputting a custom object definition when the navigation component is interacted with (e.g., clicked, etc.). In some instances, a display component for inputting a custom object definition can include an input component (e.g., text box, etc.) for inputting a custom object name. A display component for inputting a custom object definition can also include, for example, an action component (e.g., button, hyperlink, event listener, etc.) for adding a field to the custom object definition. In some instances, when a field is added to the custom object definition, a GUI can display (e.g., within the same or a different display component) one or more input components (e.g., text boxes, etc.) for inputting one or more field names for the new field, and one or more input components (e.g., dropdown lists, radio buttons, check boxes, etc.) for defining one or more data types (e.g., integer, string, related object such as user-defined custom data object or non-custom object native to an organizational data management platform, etc.) for the new field. In some instances, a field of a custom data object can include a field configured to hold one or more attachments or other files. In some instances, such a field can hold files of one or more particular types defined by a user, or can be configured to hold files of any or all types. In some instances, a GUI for defining a custom object can include a component for inputting one or more formulas (e.g., in a custom query language; in a no-code formula builder; etc.) defining a formula field configured to hold a value determined based on a formula, which may comprise one or more other fields (e.g., fields of the custom object, fields of related objects, external data; etc.).

In some instances, a GUI can display one or more input components for defining one or more validation rules associated with a particular field or combination of fields. A validation rule can define, for example, a condition that a data record must meet to be considered valid with respect to a particular field. As non-limiting illustrative examples, a validation rule can include a numerical minimum or maximum; a formatting rule (e.g., U.S. phone number must contain 10 numerical digits; date must contain month less than or equal to 12, day less than or equal to 31, and year between 1900 and 2050, etc.); a relationship (e.g., numerical comparison, etc.) with another field (e.g., gross revenue must be higher than net profit; taxable income must be greater than or equal to tax withholding amount; etc.); a relationship with an external fact or data source (e.g., deadline must be later than current date, etc.); or any other validation rule. In some instances, a GUI for defining a validation rule can include one or more input components (e.g., dropdown lists or similar selectors, etc.) for selecting a type of validation rule (e.g., numerical minimum or maximum, etc.). In some instances, a GUI can, responsive to a selection of a type of validation rule, populate one or more input components for defining a validation rule of the selected type. As a non-limiting illustrative example, input components for defining a numerical validation rule can include, for example, a numerical input box (e.g., text box configured to accept only numerical characters, etc.) and a selection input component (e.g., dropdown list, radio button, plurality of check boxes, etc.) for selecting a numerical validation rule subtype (e.g., minimum, maximum, etc.). As another example, input components for defining a numerical relationship validation rule can include, for example, a numerical input box (e.g., text box configured to accept only numerical characters, etc.), a selection input component for selecting a data item (e.g., field of the custom data object; field of a related data object; etc.) to compare to the custom field for which a validation rule is being defined; and a selection input component (e.g., dropdown list, radio button, plurality of check boxes, etc.) for selecting a numerical relationship validation rule subtype (e.g., greater than or equal to; equal to; less than; etc.).

In some instances, a GUI can display one or more input components for defining one or more security rules or data access rules (e.g., access permissions list, etc.) related to a custom data object type. In some examples, an input component for defining access permissions can include a display component for displaying one or more employees or groups of employees (e.g., employee roles, departments, project teams, etc.) and a mechanism for selecting which of the displayed employees or groups should have access to objects of the defined type. Access permissions for a custom object type can be separate from access permissions to individual data records associated with the custom object type. As a non-limiting illustrative example, an organization may choose to define an "Audit" custom data object type that is available to every member of an accounting team, while making particular data records associated with particular audits available only to employees working on that particular audit. In such an instance, an access permissions list for an "Audit" custom data object type definition could include every member of an accounting team. In this example, security permissions for individual data records could be defined later (e.g., as each data record is added) and/or a default permissions level for individual data records could be set when defining the custom data object type. In some instances, a security rule associated with a custom data object type can include a security rule defining access permissions (e.g., default access permissions, etc.) associated with individual data records. In some instances, such a security rule can be based on one or more fields of the custom data object (e.g., an "Owner" or "Creator" field defining who owns or created each data record); one or more properties of a request for creating a custom data object (e.g., requester identity, request parameter, etc.); or other appropriate data.

In some instances, a security rule associated with the one or more first interfaces can be different from a security rule associated with one or more custom object definitions or one or more data records. For example, in some instances, the one or more first interfaces can be reserved for employees having specific permissions (e.g., administrative permissions, software developer permissions, etc.), while other interfaces associated with the custom object definitions or data records can be available to different groups of employees based on different permissions (e.g., permissions based on role, department, project team, access control list identifying individual users, etc.), which can in some instances be defined through the one or more first interfaces (e.g., via no-code GUI components, etc.).

In some instances, the one or more first interfaces can include an interface for defining a custom object in a custom query language (e.g., Rippling Query Language, sometimes referred to as "RQL"). In some instances, a non-graphical interface (e.g., API, webhook, etc.) can be provided to receive a custom object definition (e.g., written in a custom query language, etc.). In some instances, a GUI for defining a custom data object type can include a component for inputting a query (e.g., associated with a custom query language such as RQL) defining all or part (e.g., individual field, validation rule, etc.) of a custom data object definition. In some instances, the GUI can include a mechanism for editing, using a custom query language, a custom data object definition generated using a no-code GUI component. For example, in some instances, a computing system can generate, responsive to receiving an input via the no-code GUI component for adding a new custom object definition, a query in a custom query language for defining a custom data object. In some instances, a computing system can update the query responsive to receiving an input via the no-code GUI component for modifying a custom object definition (e.g., adding or updating fields, adding or updating validation rules, etc.). In some instances, the GUI can include a navigation component (e.g., button) for navigating from a no-code GUI component to a query-editing GUI component. Responsive to a user navigating to the query-editing GUI component, the GUI can populate a query-editing input component (e.g., editable text box, etc.) with a current value of a custom object definition query. The GUI can, responsive to a user editing the query in the query-editing input component, update the current value of the custom object definition query.

In some instances, the GUI can include a mechanism for editing, using a no-code GUI component, a custom data object definition written in a custom query language. For example, in some instances, one or more (e.g., all) query language components (e.g., operators, keywords, etc.) associated with the custom query language can be associated with a corresponding no-code GUI component for displaying a query comprising the keyword in a no-code GUI component. As a non-limiting illustrative example, an operator>in a custom query language can correspond to a GUI component for illustrating a greater-than relationship, such as a drop-down list of numerical relationships, with a currently selected value of "greater than." Responsive to a user navigating from a query-editing interface to a no-code GUI component, a GUI can interpret a current value of a custom object definition query to generate a no-code GUI display corresponding to the current value of the custom object definition query. The GUI can provide interface components for editing the custom object-definition query (e.g., components for adding, editing, or deleting custom fields; adding, editing, or deleting validation rules; etc.). Responsive to changes in the no-code GUI component, the GUI can update the current value of the custom object definition query. The GUI can include an action component (e.g., submit button, etc.) for accepting the current value of the custom object definition query. Responsive to a user interacting with the action component, the GUI can store the custom object definition (e.g., by executing the query, etc.).

At 404, a computing system can receive, via the one or more first interfaces, a custom object definition (e.g., definition of a custom object class or custom object type, etc.). Receiving a custom object definition can include, for example, receiving a user input (e.g., via a GUI as described above); receiving an API request; receiving an HTTP request (e.g., POST request, etc.) directed at a webhook associated with the first interfaces; or otherwise receiving a communication (e.g., from another computing device via a network such as the internet, etc.) indicative of a custom object type definition. A custom object type definition can include, for example, one or more fields (e.g., attributes, database columns, etc.); one or more validation rules associated with the fields; security or data access permission information associated with the custom data object as a whole or with one or more fields of the custom data object; etc.

At 406, a computing system can store the custom object definition. In some instances, the custom object definition can be stored in a data collection (e.g., MongoDB collection, database table, database, data structure such as list or array, etc.) configured to hold a plurality of custom object definitions. Each custom object definition can be stored in one or more data records of the data collection (e.g., MongoDB document, one or more relational database rows; one or more objects in an array; one or more rows in a file, etc.). In some instances, the data collection can be configured to allow arbitrarily large custom object type definition sizes. This can include, for example, allowing a custom object type to include an unlimited or nearly unlimited number of distinct fields; allowing the custom object type to include an unlimited or nearly unlimited number of data validation rules; etc. For example, in some instances, a data collection can be a MongoDB collection, and each custom object type definition can be stored in a MongoDB document comprising a plurality of field names (e.g., "field1_name"="veterinarian_last_name", "field2_display_name"="Veterinarian Address", etc.), field data types (e.g., "field1_type"="string", etc.), validation rules (e.g. "field1_validation_rule1"="LIKE [a-z]+", etc.), security access or permissions information, etc. In some instances, a field can have a plurality of names, such as a display name and a backend name. In this manner, for instance, duplicate naming can be avoided while still allowing maximum flexibility for users defining custom data object types.

In some instances, storing the custom data object type definition can include adding the custom object to an object graph (e.g., object graph associated with an organizational data management platform). In some instances, an object graph can include an employee object and a plurality of related objects connected to the employee object. In some instances, edges of an object graph can be determined based on fields of each object identifying related objects in the object graph (e.g., employee object may be related to one or more computing device objects, one or more work payroll objects, etc.). In some instances, edges of an object graph can include virtual edges or reverse edges determined based on fields of objects identifying related objects. As a non-limiting illustrative example, if an Employee object explicitly identifies a Payroll object as a related object, but the Payroll object does not explicitly identify the Employee object as a related object, a reverse edge can be automatically associated with the Payroll object automatically identifying the Employee object as a related object. In some instances, adding the custom object to the object graph can include determining, based on the custom object definition, one or more related objects associated with the custom object; and defining, responsive to the determining, one or more edges (e.g., forward edges, reverse edges, links, etc.) between the custom object and the one or more related objects.

In some instances, an interface for defining custom objects can include an interface for defining which fields, if any, should be indexed. For example, indexing can increase a write time associated with adding or updating a data record, but can reduce a read time associated with reading the record (e.g., when filtering or searching based on the index field). In some instances, a GUI component can be provided such that a user can indicate which fields associated with a custom data object type should be indexed. In some instances, a computing system can automatically determine that some fields of a user-defined custom data object should be indexed. For example, in the absence of any user input, the computing system can determine one or more index fields based on which fields are most likely to benefit from indexing (e.g., based on a data type of each field, etc.). In some instances, a computing system can automatically index certain field types, such as related-object fields for storing data indicative of objects related to the custom data object being defined (e.g., foreign key data; uniquely identifying data associated with related-object data records such as object ID number; etc.).

At 408, a computing system can generate, based on the custom object type definition, one or more second interfaces comprising functionality to create, read, update, delete, or otherwise process data records (e.g., custom object instances) associated with the custom data object (e.g., custom object class). In some embodiments, an example second interface can include an application programming interface (API). In some instances, generating an API for processing data records associated with a particular custom object definition can include, for example, providing a general API for handling all custom data objects (e.g., all custom data objects associated with a particular organizational data management platform, etc.). A general API can include, for example, a parameter (e.g., custom object name, custom object type identification number, etc.) for selecting a custom data object type, and a parameter (e.g., command name, etc.) for selecting an action to perform (e.g., create, read, update, delete, etc.). The general API can include, for example, additional parameters associated with a particular data record (e.g., input values for each field associated with a custom data object type; security or access permission information for a particular data record; etc.). Responsive to an API call, a computing system hosting the general custom objects API can retrieve, based on the parameter for selecting a custom data object type, a custom data object definition from a data collection storing custom data object definitions. Based on the custom data object definition, the general custom objects API can map one or more parameters of the API call to one or more fields of the custom data object definition, and can create, read, update, or delete a data record associated with the custom data object definition based on the API call. In this manner, for instance, an interface for creating, reading, updating, and deleting data records associated with the custom object can be generated and stored with reduced memory usage compared to alternative implementations. For example, instead of storing a separate API comprising a separate body of computer code for each custom object, provided systems and methods may only need to store a reduced-memory-footprint custom object definition for each custom object.

In some instances, the computing system can validate the API call based on all or part of the custom object definition. For example, the computing system can compare an input associated with a particular field to a field type associated with that field in the custom object type definition. The computing system can also compare the input to one or more validation rules (e.g., user-defined data validation rules) associated with the field in the custom object type definition. The computing system can also compare security information associated with the API call (e.g., username, password, security certificate, encryption, etc.) to security information associated with the custom object type definition and/or security information associated with a particular data record. In some instances, if an API call does not comply with one or more validation rules or security rules, the computing system can deny the API request and return an error message to the requester. In some instances, validating an API call based on a custom object type definition can include validating whether a data record associated with a related-object field (e.g., foreign key field or the like) actually exists. For example, if a user-defined custom Pet object contains a Veterinarian field, then validating an API call comprising the parameter "veterinarian_id=273" can include determining whether a Veterinarian data record exists having a veterinarian identification number of 273.

In some instances, validation of an interface interaction for creating, reading, updating, or deleting a data record can be performed before or after updating a data store based on the interaction. For example, in some instances, an interface for creating, reading, updating, or deleting custom-object data records can include a bulk update interface (e.g., API, file upload, etc.) for creating, reading, updating, or deleting a plurality of data records in bulk. In some instances, processing a bulk update interface interaction (e.g., API call) can include writing, based on the interface interaction, one or more data records to a data store (e.g., database such as noSQL database); determining, after the writing and based on one or more validation rules, whether the one or more data records are valid data records; and, responsive to determining that at least one of the one or more data records is invalid, taking an action to correct the at least one invalid data record. Taking an action to correct an invalid record can include, for example, deleting the record; rolling back or otherwise undoing an update; sending an alert (e.g., to a human user); or any other appropriate action. By asynchronously updating in this manner, for instance, a bulk update interface can provide performant data updates for large bulk updates (e.g., comprising hundreds of thousands of data records per update, etc.).

In some instances, validating an interface interaction for creating, reading, updating, or deleting a data record can be performed before updating a data store based on the interface interaction. In some instances, data updates can be performed synchronously. For example, in some instances, performing a data update can include enforcing one or more presave rights (e.g., to prevent a race condition, etc.). For example, if adding a Purchase Order data record to a database requires decrementing an Inventory data record according to a number of items purchased, presave rights can include freezing or locking the Inventory data record (e.g., by flagging the Inventory data record with an indicator, etc.) to prohibit other interactions with the Inventory data record during the synchronous Purchase Order creation; determining, based at least in part on the Inventory data record, that the Purchase Order can be successfully fulfilled; updating, based on the Purchase Order being created, the Inventory data record; adding the newly created Purchase Order data record to a datastore for storing Purchase Order data records; and then, after validating the Purchase Order request and updating the Inventory data record, unlocking the Inventory data record to permit other interactions with the Inventory data record. A similar (e.g., same) process can be performed for any update whose validity may depend on an update to another related data record. Such an update can be referred to, for example, as a dependent update or conditional update.

In some instances, if an API call is valid, a computing system hosting the API can process (e.g., create, read, update, delete, etc.) a data record based on the API call. Processing a data record based on the API call can include, for example, determining (e.g., retrieving from a data store), based on the API call, a custom data object type definition associated with the API call. Processing a data record based on the API call can include, for example, translating the API call into one or more computer-readable instructions (e.g., query in a custom query language; computer code in a standard programming language; API request associated with a data storage application; etc.) based on the custom object type definition. Processing a data record based on the API call can include, for example, executing the computer-readable instructions.

Translating an API call into computer-readable instructions based on a custom object definition can include, for example, mapping one or more fields associated with the custom object definition to one or more parameters of the API call. In some instances, translating an API call into computer-readable instructions based on a custom object definition can include mapping one or more fields associated with the custom object definition to one or more fields (e.g., columns, etc.) of a data store for storing custom object data records. In some instances, the data store for storing custom object data records can be a data store configured to store data records (e.g., instances) associated with a plurality of custom object types (e.g., object classes).

Translating an API call into computer-readable instructions based at least in part on a custom object definition can include, for example, filtering one or more data records or populating one or more fields based on an API parameter identifying the custom object type. For example, an API call requesting a read, update, or deletion of one or more data records associated with a custom object type can include a parameter for filtering one or more records based on data indicative of the custom object type (e.g., name, numerical identifier, etc.). In such instances, translating an API call into computer-readable instructions can include generating, based on data indicative of the custom object type, a computer-readable instruction for filtering one or more data records based on the data indicative of the custom object type. As another example, an API call requesting creation of one or more data records associated with a custom object type can include a parameter for defining a custom object type of the one or more data records. In such instances, translating an API call into computer-readable instructions can include generating, based on data indicative of the custom object type, a computer-readable instruction for creating one or more data records having the defined custom object type.

In some instances, translating an API call into computer-readable instructions can include determining, based on the custom object definition, one or more field types associated with the API call; and determining, based on the one or more field types, one or more computer-readable instructions for converting an API input parameter (e.g., associated with a custom object field) to a value having a field type associated with the custom object definition. For example, an API may receive a plurality of input parameters in a generic or standardized format or data type (e.g., a string format, etc.); determine, based on a custom object definition, that one or more of the input parameters should be converted to a different format (e.g., integer, floating-point, Boolean, etc.); and generating, based on the determination, one or more instructions to convert the one or more input parameters to the different format. For example, an API call comprising a string parameter for defining an integer (e.g., API call comprising: param_input_values={"100", "Johnson", "true", "83.774", "Product Manager"}; API call comprising: compensation="50,000"; API call comprising: field_1_name="Pet Weight" AND field_1_value="50"; etc.) can be translated into one or more computer-readable instructions for converting the string parameter to the integer and writing the integer to a field of a data record associated with the custom object definition.

Creating a data record associated with a custom data object definition can include, for example, writing a data record to a general data collection (e.g., database table, database, file, MongoDB collection, etc.) for storing a plurality of different types of custom data object instances. In some instances, writing the data record can include writing data indicative of a custom data object class (e.g., custom object name, custom object identification number, etc.). Writing the data record can also include, for example, writing data uniquely identifying the data record (e.g., data record identification number, etc.). Writing the data record can also include, for example, writing a plurality of fields based on the API call and the custom data object type definition. In some instances, a custom object data record can store data in generic fields for storing fields associated with a plurality of custom data object classes (e.g., "field1", "field2", etc.) or in fields specific to a particular custom data object type definition. Updating, reading, or deleting a data record can include, for example, retrieving the record based on data uniquely identifying the data record, retrieving the record based on a field associated with the data record (e.g., last_name="smith", etc.), or other retrieval method (e.g., retrieving all records associated with a custom object type, etc.). Updating or deleting a data record can further include, for example, deleting, editing, or replacing a data record (e.g., based on data uniquely identifying the data record, etc.). In some instances, an API response associated with a read request can include, for example, a plurality of field names in addition to the data for populating the fields. For example, a computing system hosting the API can retrieve, responsive to an API request comprising a custom object name or other identifying information, a custom object definition associated with the custom object name or identifying information. The computing system can map, based on the custom object type definition, one or more field names contained in the API request to one or more fields of a data store for holding custom objects of a plurality of custom object classes (e.g., custom object types, entities, etc.). The computing system can retrieve, based on the API request and/or the mapped field names, one or more data records corresponding to the API request. The computing system can then provide the retrieved records to the requester who submitted the API request. When providing the retrieved records, the computing system can correlate one or more field names (e.g., the mapped field names; display names associated with a field; etc.) with the corresponding field values. For example, if a custom object type definition includes a mapping "field1_display_name='Veterinarian Name'", a computing system can return an API response showing the mapped name (e.g., "Veterinarian Name") alongside a retrieved field value associated with a retrieved data record (e.g., "John Smith", etc.).

In some embodiments, an example second interface can include a webhook interface. A webhook interface can include, for example, a uniform resource locator (URL), other address (e.g., internet address) or other contact data for interacting with the webhook. In some instances, generating a webhook interface for processing data records associated with a particular custom object definition can include, for example, initiating an event listener to monitor for requests (e.g., HTTP requests such as GET, POST, PUT, or DELETE requests, etc.) at a particular URL. In some instances, a webhook interface can process a request at a particular URL by extracting information indicative of a custom data object type (e.g. custom data object type name, custom data object type ID, etc.) from the request; retrieving a custom data object type definition based on the information indicative of a custom data object type; and processing the request based on the custom data object type definition. In other respects, a webhook interface can operate in a manner similar to (e.g., same as) an API. For example, the webhook can retrieve, responsive to a request associated with a webhook URL, a custom data object type definition. The webhook can validate the request based on one or more field types, validation rules, and/or security or permissions rules associated with the custom data object type definition or the data record itself. A webhook interface request can include parameters similar to (e.g., same as) parameters of a corresponding API request for performing the same action. A webhook interface can read, write, update, or delete data (e.g., in a data collection configured to hold a plurality of different custom data object types) in a manner similar to (e.g., same as) an API. In some instances, a plurality of interfaces (e.g., webhook interface and API) can be provided for a single data system (e.g., multiple interfaces interacting with a single data collection for custom data objects, etc.). In some instances, an address (e.g., URL) associated with a webhook can be unique to a particular custom data object type, or can be shared by a plurality of custom data object types.

In some embodiments, an example second interface can include a graphical user interface. Generating a graphical user interface for a particular object type can include, for example, retrieving a custom object type definition from a data collection (e.g., database table, MongoDB collection, etc.); determining, based on the custom object type definition, a plurality of fields and field types to be displayed; and generating, based on the fields to be displayed, a GUI component (e.g., window, frame, dialog box, etc.) for creating, reading, updating, or deleting (e.g., no-code creation, reading, updating, or deleting) one or more data records associated with the custom object type definition. For example, a GUI for creating a data record associated with a custom object type definition can include an appropriate input component (e.g., text box, check box, radio button, dropdown list, etc.) associated with each field of the custom object type definition. In some instances, an appropriate input component can be selected based on a field type associated with each field (e.g., text box for string field, check box for Boolean field, radio button for enum field, calendar input for date filed, etc.). A GUI for creating a data record can also include, for example, a Submit button or the like. In some instances, a GUI for creating a data record can include one or more data validation components. For example, in some instances, a computing system can perform a data validation immediately after a user inputs data into an input component (e.g., while a user types; immediately after the user navigates away from the input component; etc.). In some instances, a computing system can immediately display an error message (e.g., in a dialog box; in a text label adjacent to the input component; etc.) upon detecting an invalid input. In other instances, a computing system can wait until a user finishes inputting a data record (e.g., by pressing a Submit button or the like) before validating the data record according to one or more validation rules associated with the custom data object type definition and/or according to one or more security or permissions rules.

In some instances, a GUI for reading one or more data records can include a display component (e.g., cell in a spreadsheet-like data view, etc.) for each field of a particular record. A GUI for reading one or more data records can also include, for example, an input component (e.g., search bar, query input text box, no-code GUI query builder, etc.) for generating a read request associated with one or more data records. Upon receiving a read request, the GUI can determine, based on one or more permissions rules associated with a data record, whether a requester is permitted to view one or more data records, and the GUI may display any requested records that the requester is permitted to view. In some instances, a GUI for updating or deleting one or more data records can include a GUI for reading the records and vice versa. For example, a display showing a plurality of data records may include one or more "edit record" buttons or the like; one or more editable display fields that act as both display components and input components; one or more "delete record" buttons or the like; one or more checkboxes for selecting records to delete or edit; etc. In some instances, automatically generating a GUI for reading, updating, or deleting one or more data records associated with a custom object definition can include retrieving the custom object definition from a data store (e.g., database, table, collection, etc.); populating, based on the custom object definition, one or more GUI components for displaying one or more field names (e.g., display names, etc.) associated with the custom object definition; retrieving one or more data records associated with the custom object definition from a data store (e.g., database, table, collection, etc.) for storing custom object data records; mapping, based on the custom object definition, one or more fields of the one or more data records to the one or more field names; and populating, based on the mapping, one or more GUI components for displaying the one or more data records.

In some instances, a GUI for creating, reading, updating, and deleting data records associated with custom data objects can include functionality for reading, updating, and deleting data records associated with non-custom data objects (e.g., native objects associated with an organizational data management platform, etc.). In some instances, GUI components for manipulating custom-object data records can be seamlessly integrated with GUI components for manipulating non-custom-object data records. For example, a look and feel of custom-object GUI components can be similar to (e.g., same as) a look and feel of non-custom-object GUI components. In some instances, GUI components associated with custom objects can appear in the same menu(s), list(s), report(s), view(s) or other GUI component collections as one or more non-custom-objects. For example, in some instances, a GUI for reading, updating, or deleting one or more data records can include a view associated with a JOIN operation for joining one or more first data records associated with a custom object to one or more second data records associated with a related native or non-custom object. Such a view can, for example, include GUI components (e.g., cells, columns, etc.) associated with the custom object and GUI components (e.g., cells, columns, etc.) associated with the native or non-custom object in a single display component (e.g., table, spreadsheet-style view component, etc.). In some instances, an appearance, a component type, a size and shape, or any other aspect of a GUI component associated with the custom object can be similar to (e.g., same as) a GUI component associated with the native or non-custom object. In some instances, generating such a GUI can include retrieving a custom object definition; retrieving the one or more first data records and the one or more second data records according to the JOIN operation; populating, based at least in part on the custom object definition, one or more GUI components for displaying one or more first field names (e.g., display names, etc.) associated with the custom object definition and one or more second field names (e.g., display names, etc.) associated with the native or non-custom object; mapping, based at least in part on the custom object definition, one or more fields of the one or more first data records to the one or more first field names; and populating, based at least in part on the mapping, one or more GUI components for displaying a result of the JOIN operation. In some instances, a GUI or other interface for creating, reading, updating, and deleting data records associated with custom data objects can be a no-code interface, wherein a user can manipulate data records using the interface without providing any computer code. In some instances, a GUI, API, webhook, or other interface for creating, reading, updating, and deleting data records associated with custom data objects can be generated in a no-code fashion, such that a user can define a custom data object, and a computing system can automatically generate a plurality of interfaces based on the custom data object, without requiring a user to supply any computer code.

In some instances, a GUI for creating, reading, updating, and deleting records can be displayed or hidden based on one or more security or data access rules associated with the custom data object class. As a non-limiting illustrative example, an "Audit" custom object type can include permissions information indicating that members of an accounting department are permitted to interact with the "Audit" data type. In such an example, a GUI for creating, reading, updating, or deleting "Audit" records can be completely hidden from employees who are not members of the accounting department. Such permissions associated with a custom object data type can be, for example, separate from permissions associated with individual data records associated with the custom data object type. As a non-limiting illustrative example, each member of an accounting department may only see "Audit" data records associated with audits assigned to that member. In this manner, for instance, an "Audit" GUI may be completely hidden from non-accounting employees based on permissions data associated with the custom data object type, and individual data records may be hidden from or shown to accounting employees based on permissions data associated with particular data records. A GUI can include, for instance, a web application GUI, webpage, or other web browser-displayed GUI; a desktop application GUI; or any other graphical interface for a human user to interact with a computing system. In other respects, a GUI can operate in a manner similar to (e.g., same as) any manner of operation described herein with respect to an API or webhook.

In some instances, a GUI or GUI component for creating, reading, updating, or deleting a custom object can be generated dynamically based on a retrieved custom object definition (e.g., at runtime). In this manner, for instance, an interface for creating, reading, updating, and deleting data records associated with the custom object can be generated and stored with reduced memory usage compared to alternative implementations. For example, instead of storing a separate GUI comprising a separate body of computer code for each custom object, provided systems and methods may only need to store a reduced-storage-footprint custom object definition for each custom object.

At 408, a computing system can deploy the one or more interfaces. Deploying an API or webhook can include, for example, initiating a computing device configured to receive, process, and respond to API or webhook requests. Additionally, deploying an API or webhook for a particular custom data object type can include, for example, adding a custom data object definition associated with that object type to a data collection of custom data object definitions. Deploying an API or webhook can also include, for example, distributing human-readable or computer-readable documentation describing how to submit an API or webhook request. Deploying a GUI can include, for example, distributing (e.g., via a network) the GUI to one or more human users and initiating a computing device configured to receive, process, and respond to user requests submitted through the GUI.

Figure 5:
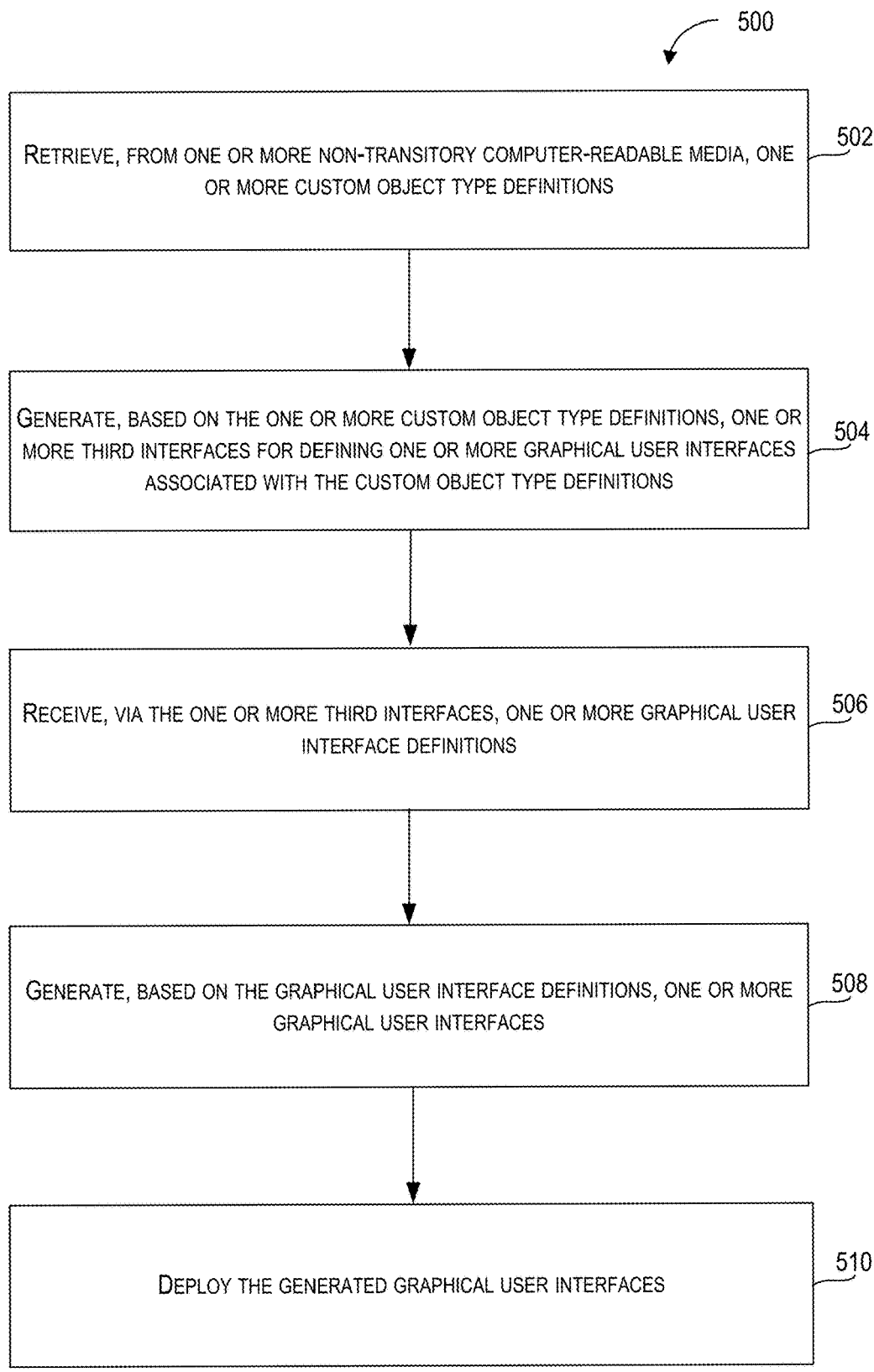
FIG. 5 depicts a flow diagram of an example method for receiving custom GUI definitions associated with custom objects, according to example embodiments of the present disclosure.

FIG. 5 depicts a flow diagram of an example method 500 for providing no-code definition of custom user interfaces associated with a custom object, according to example embodiments of the present disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 502, a computing system comprising one or more computing devices can retrieve, from one or more non-transitory computer-readable media, one or more custom object type definitions. In some instances, retrieving the custom object type definitions can include retrieving the definitions from a data collection comprising a plurality of custom object definitions. In some instances, retrieving the one or more custom object type definitions can include filtering the plurality of custom object type definitions based on one or more filters. In some instances, a filter can include security or permissions data. For example, retrieving the one or more custom object type definitions can include retrieving only the custom object type definitions that a particular user is permitted to view or access. In some instances, a filter can include a filter determined based on a user input (e.g., search bar input, etc.). In some instances, a filter can include a categorical filter (e.g., salary-related custom data objects, health-related custom data objects, etc.); a numerical filter (e.g., show first 10 custom data objects, etc.); a filter associated with a particular GUI component (e.g., custom object types related to a particular GUI window, frame, page, etc.); or any other appropriate filter. In some instances, retrieving one or more custom object type definitions can include retrieving, responsive to a user selection of a custom object type definition of interest, the custom object type definition of interest. For example, a plurality of custom object type definitions can be retrieved (e.g., based on filtering, etc.); a GUI component for selecting a custom object type can be populated based with data indicative of the plurality of retrieved custom object types; and a user can select a custom object type using the GUI component.

At 504, the computing system can generate, based on the one or more custom object type definitions, one or more third interfaces for defining one or more graphical user interfaces associated with the custom object type definitions.

An interface for receiving a graphical user interface definition can include, for example, an API, a GUI, a webhook, or any other suitable interface. For example, a user may provide information indicative of a graphical user interface in a computer language (e.g., using an API call or webhook request), in a custom computer language (e.g., custom query language), and/or via one or more graphical user interfaces (GUIs).

A third interface for receiving a GUI definition can include, for example, a GUI (e.g., no-code or low-code GUI) for defining one or more custom GUI views (e.g., pages, tabs, frames, windows, dialog boxes, tables, etc.) for creating, reading, updating, or deleting one or more data records associated with a custom data object. A custom GUI view can include, for example, a list view for viewing a plurality of data records associated with a custom data object; a detail view for viewing an individual data record associated with a custom data object; a custom report GUI view for displaying the results of a custom query associated with a custom data object; a GUI view for editing or deleting one or more data records; a GUI view for adding one or more data records associated with a custom object type; and the like. In some instances, a single GUI view can be configured to provide more than one function, such a list view comprising a mechanism to delete one or more displayed data records. For example, in some instances, a GUI third interface can include a GUI input component (e.g., dropdown list, plurality of buttons, plurality of check boxes, radio button, etc.) for selecting a type of GUI view (e.g., list view, detail view, custom report, edit view, add view, general or fully custom view built from a blank or empty GUI view, etc.) to create and a GUI action component (e.g., link, button, etc.) to begin creation of a GUI view. In some instances, a list view can comprise a plurality of navigation components enabling a user to navigate to a respective detail view associated with a respective data record of a plurality of data records of the list view. For example, in some instances, each data record displayed in a list view can be a clickable GUI component that, when clicked, causes a computing system to display a detail view associated with the data record. In some instances, a data object (e.g., custom data object, etc.) can comprise a one-to-many field, wherein a field of the custom data object is configured to hold a plurality of values, such as data indicative of a plurality of related-object data records. In such instances, a detail view associated with a data record associated with the data object can include a GUI component for displaying the plurality of values, such as an expandable or collapsible list; a separate GUI view (e.g., page, tab, table, etc.) for displaying the plurality of values; or the like.

A GUI third interface can include, for example, one or more views (e.g., pages, dialog boxes, etc.) for defining a GUI view of a particular type. In some instances, such a view can include a component for selecting one or more object types to include in the GUI view being defined. Generating a GUI third interface to define a custom GUI view can include, for example, retrieving a plurality of custom object type definitions and creating one or more GUI components (e.g., display components, input components, etc.) based on the object type definitions. For example, in some instances, a GUI for defining a custom GUI view can include a GUI component (e.g., page, window, frame, etc.) for selecting one or more data objects (e.g., user-defined custom data objects, non-custom data objects native to an organizational data management platform, etc.) to include in the GUI view or for the GUI view to be based on. In some instances, a GUI component for selecting a data object can include an object search bar and/or an object browser component. As an illustrative example, generating a GUI third interface can include retrieving all custom object type definitions that a user of the GUI third interface has permission to access; populating an object browser component with a GUI component (e.g., check box, list entry, button, display component, etc.) for each of the custom object type definitions, and a GUI component for each of a plurality of native object types associated with an organizational data management platform; and providing the object browser component to the user. In some instances, an object-browsing GUI component can seamlessly integrate custom and non-custom data objects (e.g., objects native to an organizational data management platform), such as by populating a single GUI component (e.g., dropdown list, etc.) with both custom and non-custom objects; displaying custom and non-custom objects in similar (e.g., same) ways and/or in the same menu(s), view(s), list(s), or the like; providing for user selection of custom and non-custom objects in similar (e.g., same) ways; etc. Generating a GUI third interface based on one or more custom object type definitions can also include, for example, providing a search function (e.g., search box or search bar) to a user; receiving, from the user, a search request; searching, based on the search request, a data store for storing one or more custom data object type definitions; and populating, based on one or more results of the search, a GUI component for displaying search results. In some instances, a single search function can seamlessly integrate both custom and non-custom objects, providing a mechanism for a user to search for both custom and non-custom objects using the same GUI component(s) without distinction between custom and non-custom objects. In some instances, the browser component and search component can include input GUI components to enable a user to select one or more data objects (e.g., custom or non-custom data objects) to include in a GUI view being defined.

Figure 7A:
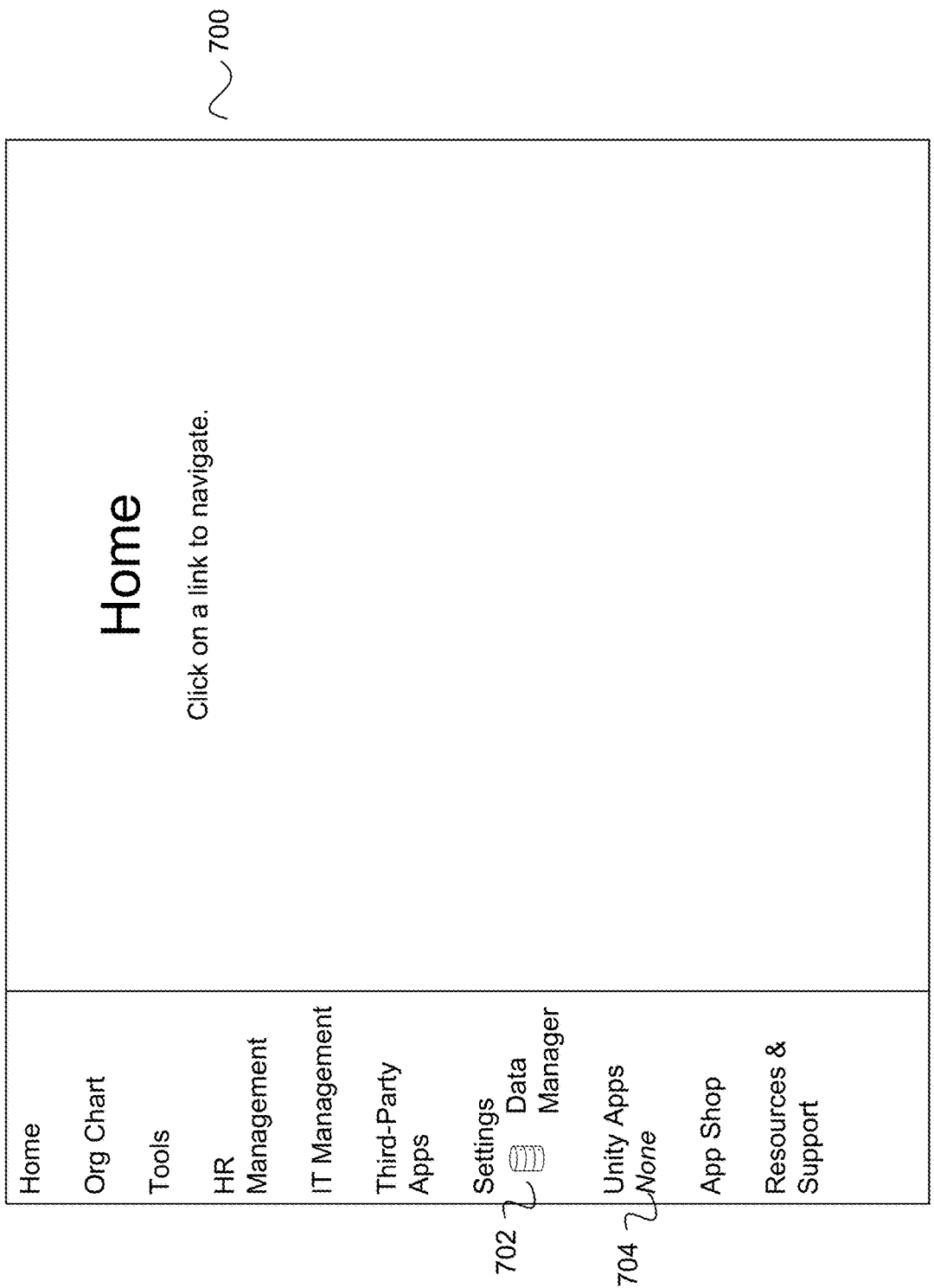
FIG. 7A depicts an illustration of a first view of an example user interface for defining a custom data object, custom application, or custom user interface, according to example embodiments of the present disclosure.
Figure 7D:
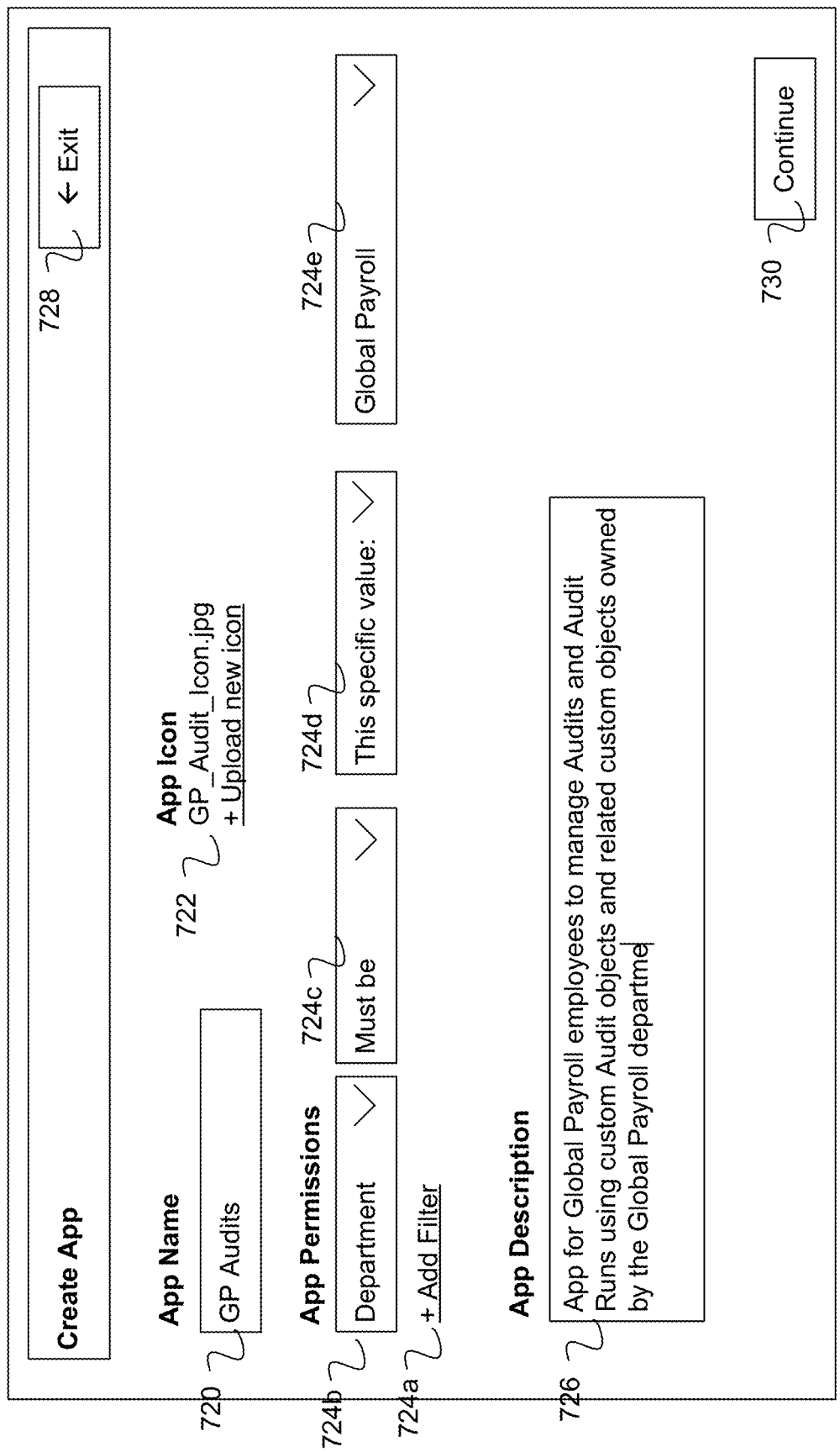
FIG. 7D depicts an illustration of a fourth view of an example user interface for defining a custom data object, custom application, or custom user interface, according to example embodiments of the present disclosure.
Figure 7E:
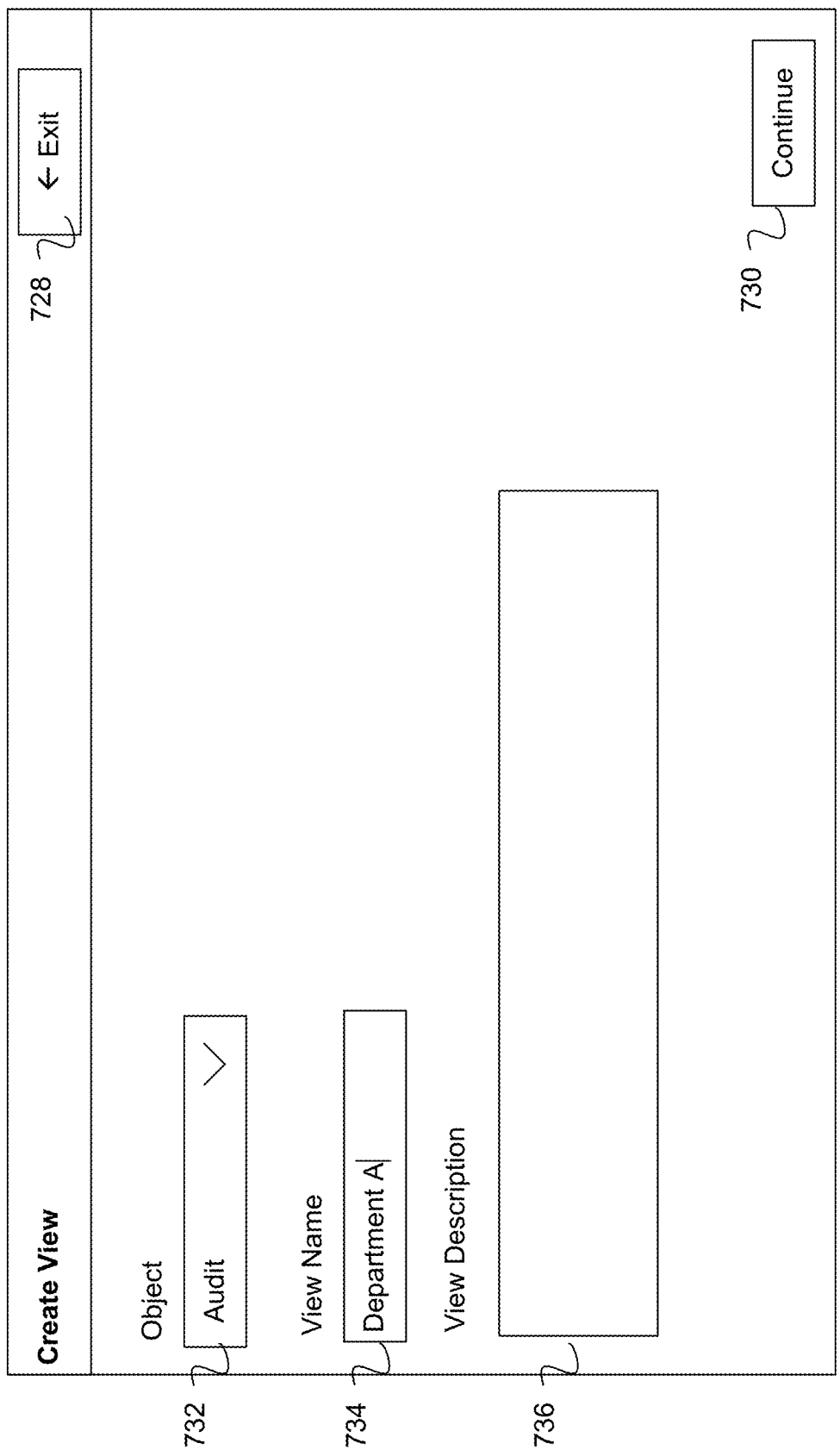
FIG. 7E depicts an illustration of a fifth view of an example user interface for defining a custom data object, custom application, or custom user interface, according to example embodiments of the present disclosure.

FIG. 7E shows an example GUI page for defining a list view associated with a custom object type definition. The example GUI page includes an example selection GUI component 732 for selecting an object type (e.g., custom object type) associated with the view being defined; an input GUI component 734 for defining a name (e.g., optional name) of the view; and an input component 736 for defining a description (e.g., optional description) for the view. The example GUI also includes navigation components 728, 730 for exiting a workflow for defining the list view (e.g., without saving a list view definition) and for continuing through the workflow. In some instances, a computing device can generate, responsive to a selection of a custom object type via selection component 732 or responsive to continuing via navigation component 730, a default list view comprising all fields of all data records of the object type. In some instances, responsive to a user interacting with the navigation component 730 for continuing the view definition workflow, the computing device can provide one or more interfaces for further defining the list view (e.g., by modifying a default view, etc.).

In some instances, generating a GUI third interface based on one or more custom object type definitions can include generating one or more GUI components for displaying fields associated with custom data objects; categories or groups of fields associated with the custom data objects; other objects related to the custom data objects and fields of the related objects; and any other appropriate data for defining GUI views related to the custom data objects. For example, in some instances, a GUI third interface can include a mechanism for a user to select (e.g., click on, mouse over, type the name of, etc.) a custom data object. Responsive to the selection, the GUI third interface can display one or more GUI components showing fields of the selected custom data object. In some instances, the fields can be grouped into categories (e.g., user-defined categories). In some instances, the categories can be expanded or collapsed, such that individual fields in each category can be displayed or not displayed depending on whether a category is selected, expanded, minimized, or the like. In some instances, a field can include one or more references to another data object (e.g., custom data object, native data object of an organizational data management platform, etc.). As a non-limiting illustrative example, a user-defined custom Pet Owner object may have a user-defined Pets_Owned field configured to hold data indicative of a plurality of user-defined custom Pet objects (e.g., unique Pet identifier associated with each of a pet owner's pets, etc.). In such an instance, a GUI third interface can, responsive to a user selecting a Pet Owner object, display a plurality of fields of the Pet Owner object, including the Pets_Owned field. Responsive to a user selecting a Pets_Owned field, the GUI third interface can display one or more fields of the Pet custom data object. In this manner, for instance, a GUI third interface can provide a mechanism for a user to select one or more fields of an object related to a custom data object to display or not display in a custom GUI being defined, wherein data indicative of the related object is stored in a field of the custom data object. In some instances, such a mechanism can be recursive, such that a user can decide to display, in a custom GUI being defined by the user, data associated with a field of an object related to an object related to a custom data object, and so on.

In some instances, generating a GUI third interface based on one or more custom object type definitions can include retrieving one or more custom object type definitions from a data store for storing custom object type definitions, wherein each custom object type definition comprises one or more fields; populating a GUI with one or more GUI components (e.g., input components, display components, etc.) for at least one field (e.g., all fields) associated with at least one custom data object (e.g., one user-selected object); and providing the GUI to a user. In some instances, at least one of the fields can have a field type associated with an object type, such as a foreign key field type or similar field type. In some such instances, a GUI third interface can include a mechanism for selecting fields of the object type associated with the field, such as a hierarchical selection mechanism. As an illustrative example, a user may define a custom Pet object having an "Owner" field indicating a user-defined Human object (or native Employee object, etc.) associated with the Pet. In such an example, a GUI third interface can include a GUI component for each field of the Pet object (e.g., input components, display components, etc.). In the illustrative example, the GUI component for the Pet's "Owner" field can include a mechanism for displaying a plurality of GUI components associated with the "Human" object type definition, such as an action component (button, link, clickable display component, etc.) for expanding and collapsing the "Owner" field to display or not display fields of the "Human" object associated with the "Owner" field. In some instances, retrieving the definitions and populating the GUI with field data can be done responsive to a user input selecting an object associated with a GUI view (e.g., list view, edit view, add data record view, etc.) being defined.

In some instances, a type of each GUI component used to populate the GUI third interface can depend on a corresponding type associated with a custom object type definition, such as a data type associated with a particular field. For example, in some instances, a custom object type definition can include some fields having an object data type (e.g., custom object type or native object type, such as an "Owner" field for identifying a corresponding data record of a "Human" object type, etc.), and some fields having non-object data types (e.g., number, string, date, datetime, binary, file attachment, etc.). In such instances, a third interface GUI component for defining a custom GUI component associated with an object field can differ from a custom GUI component associated with a non-object field. For example, a third interface GUI component associated with an object view can include a plurality of GUI components (e.g., expandible or collapsible GUI component such as an expandable or collapsible list, etc.) associated with a plurality of fields of an object type of the object field. As another example, a GUI component for selecting a format or type of a custom GUI component can be selected based on a field type associated with a custom object type definition. As a non-limiting illustrative example, a third interface GUI for defining a custom GUI view associated with an object having a date/time field can include a GUI component for selecting whether a custom GUI input component should include a calendar interface; a text box; or other input component. Similarly, a GUI component for customizing a date/time input or date/time display can include a component for selecting from a plurality of date formatting options (e.g., MM/DD/YYYY, etc.). Populating a third interface GUI can include, for example, retrieving a custom object type definition from a data store (e.g., database, etc.); determining, based on a field type of each of one or more fields of the custom object type definition, one or more GUI components for customizing a GUI view for creating, reading, updating, or deleting data records comprising the one or more fields;

and providing, to a third-interface user, a GUI view comprising the one or more GUI components.

For example, FIG. 7F depicts an example interface for selecting one or more fields of a user-defined custom data object to include in a custom view being defined. The example interface includes a plurality of input components 738 (e.g., checkboxes as depicted in FIG. 7F) for selecting which fields of a custom Audit object to include in a view being defined. The example GUI also includes navigation components 728, 730 for exiting or continuing a view definition workflow.

In some instances, one or more second interface GUIs (e.g., as described above with respect to FIG. 4) can be offered as default custom GUI views, which a user can modify using a third interface for defining a custom GUI. For example, a third interface GUI can include a GUI component for selecting a type of custom GUI view to create (e.g., list view, detailed view, editable list view or detailed view, add data record view, etc.). Responsive to receiving a user selection of a view type and one or more custom object types, the third interface can populate, based in part on a custom object type definition and based in part on a default view associated with the view type, a GUI for defining a view having the view type. For example, the third interface can retrieve, from a data store (e.g., database, etc.) a custom object type definition associated with the selected custom objects; populate, based on the custom object type definition, a plurality of GUI components based on a plurality of fields of the custom object type; and configure, based on the default view, the GUI components. As an illustrative example, a default list view could include displaying all fields associated with a custom object type; in such instances, a third interface could generate a plurality of GUI components (e.g., check boxes, etc.) associated with a plurality of fields of the custom object, and the third interface could configure the GUI components based on the default view by, for example, ensuring that all of the GUI components associated with the fields are in a "selected" configuration or similar configuration (e.g., all check boxes are checked, etc.). However, populating a third GUI based on a default view is not required; for example, in some instances, a user of a third GUI could start from a "blank" GUI view, and could define a custom GUI view by progressively adding user-selected GUI components to the blank view.

In some instances, a third interface GUI can include one or more components (e.g., GUI views, etc.) for defining a data filter, such as a filter limiting which data records should be shown to a user in a custom GUI view for reading, updating, or deleting a data record associated with the custom GUI view (e.g., list view, detailed view, editable list or detailed view, etc.). A data filter can be based, for example, on one or more fields of a custom object type associated with the custom GUI view. For example, a data filter can be based on a comparison between a field of the data record and one or more values defined by a third-interface user defining the custom GUI view. For example, a filter can include a filter for excluding any data record for which the value in a particular field is not above or below a particular threshold; is not equal to one of a plurality of values; does not satisfy a formula (e.g., a formula based on one or more other fields, etc.); or any other filter based on one or more fields of a custom object type. In some instances, a component for defining a data filter can include components depicted in FIG. 7G and further described below.

In some instances, a third interface can include a mechanism for editing or otherwise defining a layout of the custom GUI view being defined. For example, in some instances, a third interface can include a drag-and-drop interface for configuring a layout of the custom GUI view being defined. A drag-and-drop interface can include, for example, a plurality of GUI components of the third interface, which can be respectively associated with a plurality of GUI components of the custom GUI view being defined. Each respective component of the third-interface drag-and-drop interface can be configured to be dragged and dropped, meaning that a user can click the respective component, drag it to another area within the third-interface GUI (e.g., while holding down a mouse button), and can drop the respective third-interface component into the new area, where it can remain unless a user drags and drops it again.

As a non-limiting illustrative example, a third interface can include a plurality of GUI components associated with a plurality of fields associated with a custom data object type, and an order of the fields can be rearranged within the third-interface GUI. Responsive to a user rearranging a plurality of drag-and-drop GUI components in the drag-and-drop interface, the third interface can update a custom GUI view definition, such that the order of the fields of the custom GUI view can correspond to the order of the fields in the drag-and-drop component. As an illustrative example, components 738*a-g* of FIG. 7F can in some instances be drag-and-drop components, wherein a user can rearrange the order of the listed fields within the GUI of FIG. 7F, and a custom GUI view defined in this way can display the fields in the rearranged order. For example, the GUI view depicted in FIG. 7I shows an Owner field 756*d* and ID field 756*a* being displayed after category 756*e*, last_run 756*f*, and num_items 756*g* fields. Such a layout can be defined by a user, for example, from the user interface depicted in FIG. 7F by dragging the Owner GUI component 738*d* and ID GUI component 738*a* to the bottom of the field list 737. As another illustrative example, a third interface can include a what-you-see-is-what-you-get preview component, wherein the third interface can generate a preview GUI view corresponding to all or part of the custom GUI view as currently defined. The preview GUI view can include, for example, a drag-and-drop interface wherein one or more GUI components (e.g., columns of a table, etc.) can be dragged and dropped to edit a layout of the custom GUI view. For example, the interface depicted in 7F includes a blank space 739 to the right of the field list 737. In some instances, a preview table showing an example list view can be populated in the blank space 739 as one or more fields of the field list 737 are selected, and the example list view can include a drag-and-drop interface for rearranging an order of the columns. Other implementations are possible.

In some instances, a layout of the custom GUI view being defined can be selected or edited in a manner that may not involve a drag-and-drop interface. For example, a third interface GUI can include a mechanism for selecting a plurality of GUI components to include in a GUI view (e.g., plurality of fields to include as columns in a list view table, etc.), and a layout of the plurality of GUI components can depend on an order in which the GUI components are selected by a user for inclusion in the GUI view. As a non-limiting illustrative example, the interface depicted in FIG. 7F can enable a user to select the GUI layout depicted in FIG. 7I by first selecting the "category" field (e.g., by checking the "category" check box) for inclusion in the custom GUI view of FIG. 7I; then selecting the "last_run"

field; then the "num_items" field; then the Owner field, and then the ID field. Other implementations are possible.

In some instances, a third-interface GUI for defining a GUI view can include a mechanism for defining a degree to which a user of the custom GUI view can customize or otherwise configure the custom GUI view. For example, an administrator can define a custom GUI view having a custom (i.e., defined by an administrator) default view (i.e., to be shown to a user who has not further customized the view), and individual users of the custom GUI view can further configure their own GUI experience to be different from the custom default view defined by the administrator. In some instances, a third-interface GUI can include one or more GUI input components (e.g., plurality of checkboxes, etc.) for defining (e.g., by an administrator) a degree to which the custom GUI view can be customized. For example, a third-interface GUI can include one or more GUI input components for selecting which components (e.g., tables, columns, fields, etc.) of a custom GUI view can or cannot be removed from the view by an individual user of the custom GUI view; which components can or cannot be rearranged (e.g., via a drag-and-drop layout editor, etc.) by an individual user, and the like. As an illustrative example, a regulation may require an employer to show certain data to each of its employees; to facilitate compliance with such a regulation, an administrator may define a custom GUI view that displays the information, wherein an individual employee is prohibited from modifying the custom GUI view so that it does not display the required information.

A third-interface GUI for defining a custom GUI view associated with a custom data object can include, for example, one or more GUI components (e.g., buttons, etc.) for adding, editing, or deleting a GUI component of the custom GUI view being defined. For example, a third interface can include an "Add" button for adding GUI components. Responsive to a user interacting with the Add button, a third interface can provide an "Add" GUI view (e.g., dialog box, page, etc.) for adding a GUI component to the custom GUI view. The Add view can include, for example, one or more GUI components for selecting a type of GUI component to add (e.g., table, column, button, link such as edit/delete link associated with a list view, etc.). Responsive to a user selection of a type of GUI component to add, an Add view can provide the user with one or more GUI components for configuring one or more properties (e.g., name, label, size, shape, font, location within GUI view, native or custom object or field associated with the GUI component, etc.) of the GUI component being added. Similarly, a third-interface GUI can include one or more "Edit" and "Delete" action components (e.g., buttons, links, etc.) for navigating to an Edit view or Delete view for editing or deleting a component of the custom GUI view being defined. As a non-limiting illustrative example, a third-interface GUI can include a plurality of right-clickable GUI components associated with a plurality of corresponding components of a custom GUI view being defined, and right-clicking can generate a menu comprising an "Edit" option and a "Delete" option. An edit view can include, for example, one or more GUI components for configuring one or more properties (e.g., component type, name, label, size, shape, font, location within GUI view, native or custom object or field associated with the GUI component, etc.) of the GUI component being edited. Editing a GUI component can include changing a type of the GUI component (e.g., from editable view component to non-editable view component, etc.). These can be, for example, the same as or different from a corresponding component for configuring one or more properties in an Add view. A delete view can include, for example, a view (e.g., dialog box, etc.) asking for confirmation that the viewer would like to delete a GUI component from a custom GUI view being defined.

In some instances, a third interface GUI for defining a custom GUI view can include one or more interfaces for customizing a search display. For example, a third interface GUI can include a GUI component for adding, deleting, or otherwise determining whether to include or not include a search component in a custom GUI view being defined. The third interface GUI can also include, for example, a mechanism for a user to select one or more objects or fields that the search interface of the custom GUI being defined should be able to search. For example, a default search configuration could include searching all fields of a custom object associated with the custom GUI view being defined; searching all indexed fields; searching one or more particular fields selected by the third-interface user defining the custom GUI view; or any other field or combination of fields. In some instances, a search interface of the custom GUI being defined can include a field selection GUI component (e.g., dropdown menu, etc.) for a user of the custom GUI to select an object or field to search. In some instances, a third interface GUI for defining a custom GUI view can include a mechanism for editing a display associated with the search interface. For example, in some instances, a search interface can be configured to begin searching as a user types, and can provide a preliminary display of search results (e.g., first five results, etc.) based on a partial user input (e.g., partial text input, etc.) to a search interface component (e.g., text box, etc.). In some instances, the preliminary display can be clickable, such that a user can begin typing a search string into the text box; see a preliminary display showing a data record the user is attempting to search for; and click on the data record to navigate to another view (e.g., detailed view, etc.) associated with the data record. In such instances, a third interface GUI can include a GUI component for configuring the preliminary display. For example, configuring the preliminary display can include selecting one or more fields to be included or not included in the preliminary display associated with the search interface. For example, a search interface associated with a custom Veterinarian object can be defined by a user to allow searching by Veterinarian name, and one or more additional fields (e.g., other than Veterinarian Name, such as address, city, business name, etc.) can be included (e.g., according to a third-interface user's selection) in a preliminary display so that a searcher can easily distinguish between veterinarians having similar or identical names.

In an embodiment, a GUI third interface may include one or more of lists of one or more entities (e.g., custom data objects, etc.) from a system of record, one or more operations from entities from a system of record, one or more third-party applications integrated with a system of record, one or more operations associated with respective third-party applications integrated with a system of record, and/or any other available information to enable a user to configure a custom graphical user interface. In an example, the user interfaces and associated information provided for configuring a custom graphical user interface may be determined based on analyzing one or more data structures 315 associated with a system of record.

In some instances, a GUI for defining a custom GUI view and/or a GUI component associated with a custom data object type can be displayed or hidden based on one or more security or permissions rules associated with the custom data object type. Such permissions associated with a custom object data type can be, for example, separate from permissions associated with individual data records associated with the custom data object type. Additionally, permissions for defining a custom GUI view can be separate from permissions for using the custom GUI view. As an illustrative example, a system administrator may have permission to create custom GUIs or custom applications associated with one or more custom data objects, and the system administrator may define security permissions identifying which individuals (e.g., non-administrator employees of an organization) have permission to use the custom GUIs or apps. Additionally, permissions for a GUI view can be separate from permissions associated with a custom object type shown in that view. As an illustrative example, a user may be permitted to view a first GUI view associated with a custom object, but may be denied access to a second GUI view associated with the same custom object. Additionally, permissions for an individual GUI component (e.g., table, column, button, etc.) can in some instances be separate from permissions for a GUI view comprising that component. As an illustrative example, a user may define a "View Employee Compensation" page that may comprise an "Edit Employee Compensation" button accessible only to employees in a "manager" or "human resources" role. In some instances, a GUI for defining one or more permissions (e.g., GUI view permissions, GUI component permissions, custom object type permissions, data record permissions, etc.) can treat native and custom objects interchangeably, such that a user defining a custom GUI view can use identical GUI components to define permissions rules for GUI components associated with native and custom object types.

In some instances, a third GUI for defining a custom GUI view can include one or more GUI components for defining security permissions data associated with the GUI view being defined. For example, the third GUI can include a navigation component (e.g., "Set Permissions" button, etc.) configured to access a view (e.g., page, dialog box, etc.) for defining one or more permissions associated with the custom GUI view. The permissions defined can include, for example, permissions associated with the GUI view being defined; permissions associated with a GUI component of the GUI view being defined; or permissions associated with data records associated with the GUI view being defined. For example, permissions associated with a custom GUI view (e.g., page, tab, etc.) can include permission data defining which users (e.g., employees, etc.) should see the custom GUI view (e.g., from a homepage or dashboard; when accessing one or more apps; etc.). Permissions associated with a custom GUI component (e.g., table, button, etc.) can include permission data defining which users should see the GUI component when accessing the custom GUI view. Permissions associated with data records can include, for example, a first data filter defining which data records a first user group should see when accessing the custom GUI view being defined; a second data filter defining which data records a second user group should see; and so on. In some instances, permissions associated with data records can include, for example, a relative data filter that defines which data records a user should see based on a property (e.g., department, role, project group, etc.) associated with the user. As an illustrative example, data records permission data can include a relative filter indicating that each user should only see data records owned by employees of the same department the user belongs to. In some instances, data filters associated with a particular user-defined custom GUI can be separate from data record permissions associated with the data records themselves (e.g., permissions associated with an underlying database for storing the data records, etc.). In such instances, a custom GUI can be configured to only display data records for which a user satisfies all permissions requirements (e.g., data filter requirements associated with a custom GUI; backend permissions requirements associated with a data records; permission to view the custom GUI itself; etc.).

Figure 7G:
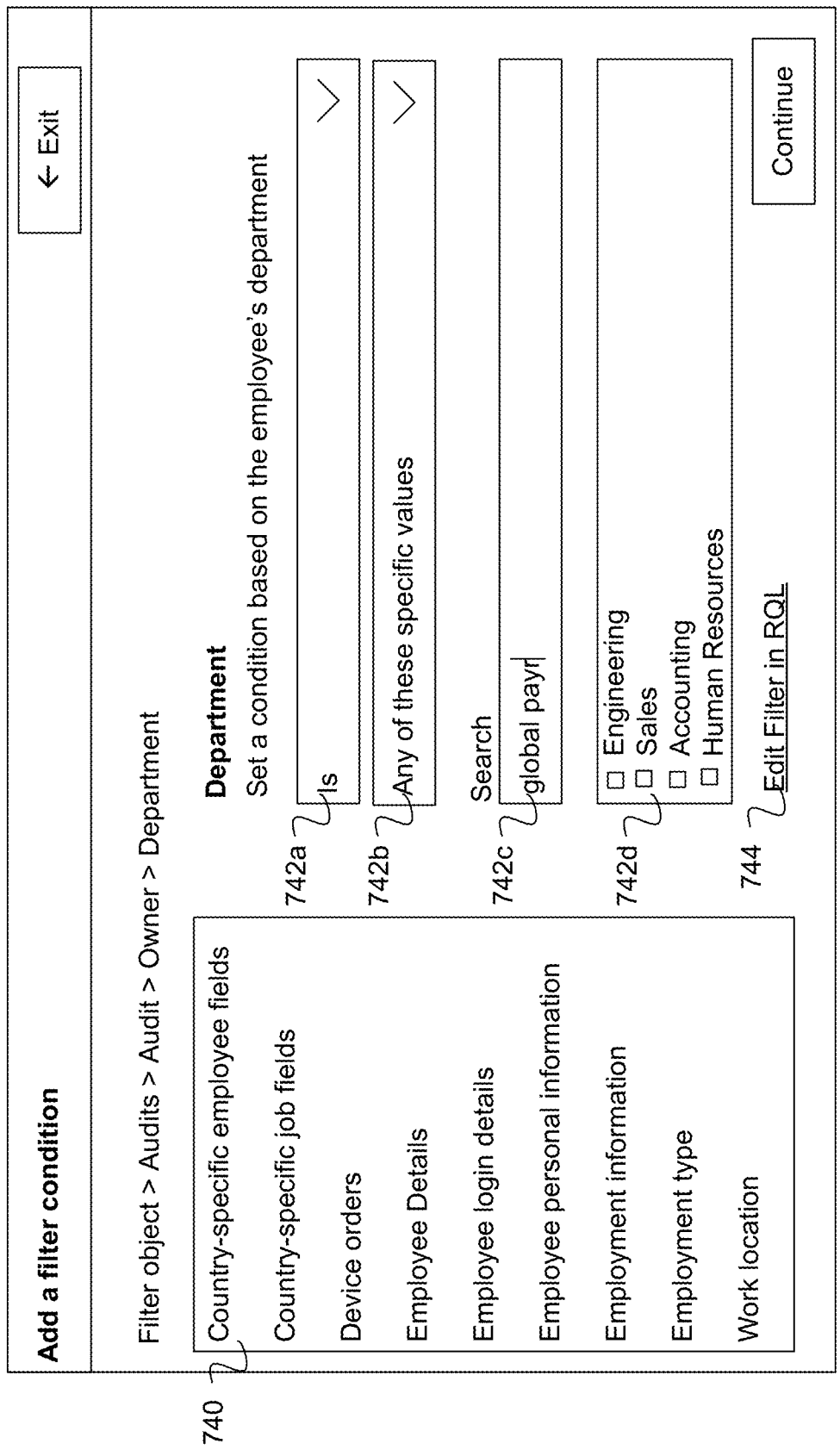
FIG. 7G depicts an illustration of a seventh view of an example user interface for defining a custom data object, custom application, or custom user interface, according to example embodiments of the present disclosure.

Third GUI components for defining permissions can include, for example, components for selecting one or more properties of a user, wherein each user having the one or more properties can be given permission to access a particular resource (e.g., custom GUI, data record, etc.). For example, in instances where each user is associated with a data record indicative of the user (e.g., Employee data record in an organizational data management platform, wherein each user is an employee of the organization), third GUI components for defining permissions can include GUI components for selecting a field associated with the data object and defining one or more permissions rules (e.g., GUI view access rules, GUI component access rules, etc.) based on the selected field. For example, GUI components for defining rules based on the field can include a no-code GUI component for selecting a relationship (e.g., must be equal to, less than, greater than; cannot be equal to; must be one of a plurality of values; etc.); and one or more components for selecting a value associated with the relationship. As an illustrative example, in some instances, third GUI components for defining permissions can include components that are similar to (e.g., same as) components depicted in FIG. 7G for defining one or more filters. For example, FIG. 7G depicts input components 740, 742*a-d* for defining a data filter based on one or more properties of an Owner of a data record. In some instances, a third GUI view for defining security permissions can include GUI components that are similar to (e.g., same as) input components 740, 742*a-d* or input components 724*a-e* for defining security permissions based on one or more properties of a user as described with respect to FIG. 7D. For example, in an organizational data management platform where each user is associated with a data record associated with an Employee data object, input components 740, 742*a-d* can be used to select one or more Employee properties the user must have to access a custom GUI view or custom GUI component.

In some instances, a GUI for creating a custom GUI view can include, for example, one or more Submit buttons or the like. A GUI can include, for instance, a web application GUI, webpage, or other web browser-displayed GUI; a desktop application GUI; or any other graphical interface for a human user to interact with a computing system.

In some instances, an example third interface for defining a custom GUI view can include an API. In some instances, generating an API for defining custom GUI views associated with a particular custom object definition can include, for example, providing a general API for handling all custom GUI view definitions (e.g., associated with both custom and non-custom data objects). A general API can include, for example, one or more function definitions describing functions for defining a custom GUI view (e.g., a separate function for each of a plurality of GUI view types, such as list view, detail view, etc.). A function definition can include, for example, one or more parameters for selecting objects (e.g., custom data objects) or fields (e.g., fields of custom data objects) associated with the custom GUI view being defined, or other aspects of the custom GUI being defined (e.g., view type parameters, filter parameters, etc.). Responsive to an API call, a computing system hosting the general custom objects API can retrieve, based on a parameter for selecting a custom data object type, a custom data object definition from a data collection storing custom data object definitions. Based on the custom data object definition, the general custom objects API can map one or more parameters of the API call to one or more fields of the custom data object definition, and can generate a custom GUI definition associated with the custom data object definition based on the API call. In this manner, for instance, an interface for defining custom GUI views associated with the custom object can be generated and stored with reduced memory usage compared to alternative implementations. For example, instead of storing a separate API comprising a separate body of computer code for each custom object, provided systems and methods may only need to store a reduced-memory-footprint custom object definition for each custom object.

The general API can include, for example, additional parameters associated with particular data records (e.g., input validation parameters for one or more fields associated with a custom data object type; filter parameters for filtering data records based on one or more fields associated with a custom data object type; security or access permission information; etc.). Responsive to an API call, a computing system can in some instances validate the API call (e.g., based on all or part of one or more custom object definitions, etc.). For example, the computing system can compare security information associated with the API call (e.g., username, password, security certificate, encryption, etc.) to security information associated with one or more custom object definitions and/or general security or data access policies of an organization. For example, in some instances, permission to define a custom GUI view may be provided to one or more categories of user (e.g., users with administrative permissions or developer permissions; users in a particular role, department, etc.) and denied to other users. In some instances, if an API call does not comply with one or more validation rules or security rules, the computing system can deny the API request and return an error message to the requester.

In some instances, if an API call is valid, a computing system hosting the API can generate, store or otherwise deploy a custom GUI definition based on the API call. Storing the custom GUI definition can include, for example, writing the custom GUI definition to a datastore (e.g., database, file, etc.) for storing custom GUI definitions. Generating a custom GUI definition based on the API call can include, for example, determining (e.g., retrieving from a data store), based on the API call, a custom data object type definition associated with the API call. Generating a custom GUI definition based on the API call can include, for example, translating the API call into one or more computer-readable instructions (e.g., query in a custom query language; computer code in a standard programming language; API request associated with a data storage application; etc.) or computer-readable data (e.g., data record in a database for storing custom GUI definitions, etc.) based at least in part on the custom object type definition. Storing a custom GUI definition based on the API call can include, for example, storing the computer-readable instructions or computer-readable data.

In some instances, translating an API call into computer-readable instructions or computer-readable data can include determining, based on the custom object definition, one or more field types associated with the API call; and determining, based on the one or more field types, one or more computer-readable instructions for generating a GUI component (e.g., input component, display component, etc.) associated with the field type.

Storing a custom GUI definition associated with a custom data object definition can include, for example, writing a data record to a general data collection (e.g., database table, database, file, MongoDB collection, etc.) for storing a plurality of different types of custom GUI definitions. In some instances, writing the data record can include writing data indicative of a custom data object class (e.g., custom object name, custom object identification number, etc.); data indicative of one or more fields of the custom data object class; data indicative of one or more GUI components to include; or other appropriate data.

In some instances, a custom GUI view can have any property described above with respect to second interfaces for creating, reading, updating, and deleting data records associated with custom data objects. For example, generating or deploying a custom GUI view (e.g., default view, etc.) can in some instances include performing any action described with respect to FIG. 4 for generating or deploying a second interface for creating, reading, updating, and deleting data records associated with custom data objects.

In some instances, a custom GUI view can include a custom action component (e.g., button, etc.) for performing a corresponding custom action. In some instances, a custom action can be defined for other GUI components, such as a custom action to be performed when a list view, detailed view, add view, delete component, edit view, or the like is interacted with. As a non-limiting illustrative example, a user may define a custom "read" action configured to track a number of times a data record or custom object type has been viewed, wherein a value (e.g., value stored in a data store of an organizational data management platform, etc.) is incremented each time a list view GUI comprising the data record or custom object type is displayed to a user. Other custom actions are possible. In some instances, a third interface GUI for defining a custom GUI view can include one or more components for defining a custom action to be performed when a custom action component or other GUI component is interacted with. In some instances, a custom action can include a creation, read, update, or deletion of a data record associated with a custom object type. In some instances, a custom action can include one or more other actions, such as automated workflow actions to be performed whenever a particular GUI component is interacted with by a user. For example, a third interface can include a GUI component for defining a custom action to be performed whenever a data record is updated via an update GUI component; whenever a data record is created via a creation GUI component; whenever a data record is deleted via a deletion GUI component; whenever an added, deleted, or updated data record meets one or more criteria (e.g., value of a particular field less than, greater than, or equal to a particular threshold, etc.).

For example, a custom action can include operations that may cause an application or system to perform one or more operations internally, may cause the application or system to perform one or more operations in association with an external application or system (e.g., based on an integration, etc.), or may cause the application or system to perform one or more operations both internally and with an external application or system. In one example, the one or more operations may include performing any operation available in a system of record, any operation available from an application provided for use with the system of record, and/or any operation available from a third-party application integrated with the system of record. Some examples of operations may include, but are not limited to, updating organizational data 311, advancing progression of a workflow, completing a workflow, evaluating a formula, assigning a task, updating status of a task, completing a task, initiating evaluation of an automated workflow, approval of a request, denial of a request, generation of one or more alerts, transmission of one or more alerts (e.g., email alerts; mobile phone text message alerts; application-specific messages such as push notifications, API calls, Slack messages, Zendesk tickets, or other application-specific messages or alerts, etc.), generation of one or more messages, transmission of one or more messages, generating and sending a request to another application, initiating an action or event in another application, installing an application on a user device, applying a software update to a user device, setting one or more configurations on a user device, setting one or more configurations for each of one or more applications provided to a user, setting one or more configurations for each of one or more applications on a user device, and/or performing any other types of actions within a system of record and/or across any number of applications. As a non-limiting illustrative example, a custom action can include, responsive to receiving an updated data record associated with a custom data object via a custom GUI, comparing the updated data record to a second data record (e.g., associated with a second custom data object and/or second third-party application) and determining, based on the comparison, whether to send an alert (e.g., if conflicting or inconsistent data is detected, etc.).

In some instances, an interface for defining a custom GUI can include an interface for defining a custom GUI in a custom query language (e.g., Rippling Query Language, sometimes referred to as "RQL"). In some instances, a non-graphical interface (e.g., API, webhook, command line interface, etc.) can be provided to receive a custom GUI definition (e.g., written in a custom query language, etc.). In some instances, a GUI for defining a custom GUI can include a component for inputting a query (e.g., associated with a custom query language such as RQL) defining all or part (e.g., security permissions, data filters, etc.) of a custom GUI definition. In some instances, the GUI can include a mechanism for editing, using a custom query language, a custom GUI definition generated using a no-code GUI component. For example, in some instances, a computing system can generate, responsive to receiving an input via the no-code GUI component for adding a new custom GUI definition, a query in a custom query language for defining a custom GUI. In some instances, a computing system can update the query responsive to receiving an input via the no-code GUI component for modifying a custom GUI definition. In some instances, the GUI can include a navigation component (e.g., button) for navigating from a no-code GUI component to a query-editing GUI component. Responsive to a user navigating to the query-editing GUI component, the GUI can populate a query-editing input component (e.g., editable text box, etc.) with a current value of a custom GUI definition query. The GUI can, responsive to a user editing the query in the query-editing input component, update the current value of the custom GUI definition query.

In some instances, the GUI can include a mechanism for editing, using a no-code GUI component, a custom GUI definition written in a custom query language. For example, in some instances, one or more (e.g., all) query language components (e.g., operators, keywords, etc.) associated with the custom query language can be associated with a corresponding no-code GUI component for displaying a query comprising the query language component in a no-code GUI component. As a non-limiting illustrative example, an operator>in a custom query language can correspond to a GUI component for illustrating a greater-than relationship, such as a drop-down list of numerical relationships, with a currently selected value of "greater than." Responsive to a user navigating from a query-editing interface to a no-code GUI component, a GUI can interpret a current value of a custom GUI definition query to generate a no-code GUI display corresponding to the current value of the custom GUI definition query. The GUI can provide interface components for editing the custom GUI definition query. Responsive to changes in the no-code GUI component, the GUI can update the current value of the custom GUI definition query. The GUI can include an action component (e.g., submit button, etc.) for accepting the current value of the custom GUI definition query. Responsive to a user interacting with the action component, the GUI can store the custom GUI definition (e.g., by executing the query, etc.).

As an example, FIG. 7G depicts a navigation component 744 for navigating to a GUI for editing a filter in a custom query language (e.g., RQL). In some instances, an initial state of the query editor GUI can be populated based on the state of input components 742a-d depicted in FIG. 7G. Similarly, responsive to a user editing a query in the query editor GUI and returning to the example GUI view of FIG. 7G, input components 740, 742a-d can be populated based on the edited query.

In some instances, a custom query language can serve as a language-agnostic, application-agnostic, or system-agnostic wrapper for one or more data management applications (e.g., database applications, etc.). For example, a custom query language can define one or more data operations that are abstracted from, and independent of, a native query language, programming language, application, or computing system for performing the data operations. A computing system (e.g., organizational data management platform) implementing the custom query language can include one or more components for interpreting the custom query language or translating the custom query language into a second language (e.g., programming language, native query language associated with a data management application, etc.), and one or more components for executing the translated query (e.g., database applications, etc.). The second language can be referred to as a "backend" language, and a custom query language can be exposed to one or more users as a frontend language. In some instances, one or more backend languages can be substituted for a different backend language by substituting one or more translation components, without modifying the frontend custom query language. In this manner, for instance, an organizational data management platform can be migrated to a new (e.g., more efficient or more scalable) application or system without modifying a user experience associated with the organizational data management platform.

In some instances, a custom query language can seamlessly treat custom objects and non-custom objects interchangeably (e.g., from a frontend user's perspective). For example, a custom query language can include an interpreter for translating queries containing references to both custom objects and non-custom objects. In some instances, a frontend syntax in the custom query language can be similar (e.g., same) with respect to both custom and non-custom objects. In some instances, a computing system can process custom and non-custom objects according to different methods (e.g., to achieve a similar or same result). For example, interpreting a custom query language query can include identifying an object type associated with the query; determining, based on a data store comprising object type information (e.g., object data graph comprising organizational data; data collection storing custom object type definitions; etc.), whether the object type is a custom object type; retrieving, responsive to determining that the object type is a custom object type, a custom object type definition associated with the custom object type; and processing, based at least in part on the custom object type definition, the query. Interpreting or processing a custom query language query can also include processing, responsive to determining that an object type is not a user-defined custom object type, the query based on a static query interpreter.

In addition to a no-code or low-code GUI third interface, an example third interface can include one or more code-based interfaces. For example, in some embodiments, an example third interface can include an API (e.g., general API as described above). As another example, a third interface can in some instances include a webhook interface. A webhook interface can include, for example, a uniform resource locator (URL), other address (e.g., internet address) or other contact data for interacting with the webhook. In some instances, generating a webhook interface for processing data records associated with a particular custom object definition can include, for example, initiating an event listener to monitor for requests (e.g., HTTP requests, etc.) at a particular URL. In other respects, a webhook interface can operate in a manner similar to (e.g., same as) an API. For example, the webhook can retrieve, responsive to a request associated with a webhook URL, a custom GUI view definition associated with one or more custom data object types. The webhook can validate the request based on one or more field types, validation rules, and/or security or permissions rules associated with the custom data object type definition. A webhook interface can store or deploy a custom GUI view definition in a manner similar to (e.g., same as) an API. In some instances, a plurality of interfaces (e.g., webhook interface, API, GUI, command line interface, custom query language interpreter, etc.) can be provided for a single data system (e.g., multiple interfaces interacting with a single data collection for custom data objects, etc.).

In some instances, a GUI, API, webhook, or other interface for defining custom GUIs associated with custom data objects can also include an optional interface for providing code if desired (e.g., as part of a low-code solution). For example, in some instances one or more actions to be performed by a computing system deploying a custom application or custom GUI can be defined in a computer language (e.g., JavaScript, etc.) as part of a low-code solution. For example, in some instances, a large but finite number of action options can be provided on a no-code basis, and one or more interface components (e.g., GUI components, etc.) can be provided for inputting user-written computer code, such that any arbitrary action can be enabled in a custom GUI. As a non-limiting illustrative example, a third interface for defining a custom GUI can include a mechanism to add a custom action component (e.g., button, link, clickable GUI component, etc.), and a mechanism to define one or more computer-readable instructions (e.g., JavaScript code, etc.) to be executed when the custom action component is interacted with (e.g., clicked, etc.). In some instances, user-written code can include client-side code configured to run only on a client device (e.g., using a web browser running on a client device, etc.), such that a user can be permitted to run arbitrary code on a computer controlled (e.g., owned) by the user or for which the user has appropriate permissions to write client-side code (e.g., computer owned by user's employer, etc.), without necessarily being given the ability to run arbitrary code on another computing device (e.g., server computing device, etc.). In this manner, for instance, security (e.g., from malicious code or from accidental interference due to flawed code, etc.) of a server computing device can be maintained. In some instances, deploying a custom GUI definition comprising user-written code can include storing the user-written code in a datastore for storing custom GUI definitions; detecting an event (e.g., interaction with a GUI action component, etc.) associated with a client or server computing system (e.g., organizational data management platform, etc.); and, responsive to detecting the event, running the user-provided code (e.g., on a client computing device). In some instances, user-provided client-side code can include one or more requests to a server (e.g., associated with an organizational data management platform) to perform a server-side action. In some instances, a mechanism for requesting server-side actions in client-side code can be provided via an API, software development kit (SDK), or other tool for implementing server-side requests.

In some instances, a third interface GUI can include a GUI component for sharing a custom GUI view with others. For example, in some instances, a third interface GUI can include one or more GUI components enabling an administrator to select one or more users (e.g., by department, by role, by individual name or employee ID, etc.) to share the custom GUI view with via each user's homepage, dashboard, or the like. In some instances, a third interface GUI can include one or more GUI components enabling a user to share a custom GUI view in other ways. For example, a third interface GUI can include an action component (e.g., button, etc.) that, when interacted with (e.g., clicked), causes a computing device to upload the custom GUI view to a GUI sharing service (e.g., app store, etc.); generate a shareable link that, when clicked, enables a user to download the custom GUI view; download an executable comprising the GUI view; or the like.

At 506, the computing system can receive, via the one or more third interfaces, one or more graphical user interface definitions. Receiving a GUI definition can include, for example, receiving a user input (e.g., via a GUI as described above); receiving an API request; receiving an HTTP request (e.g., POST request, etc.) directed at a webhook associated with the first interfaces; or otherwise receiving a communication (e.g., from another computing device via a network such as the internet, etc.) indicative of a GUI definition. A GUI definition can include, for example, data indicative of one or more GUI views (e.g., pages, tabs, windows, dialog boxes, tables, etc.), input components (e.g., text boxes, buttons, check boxes, dropdown lists, etc.), display components (e.g., text displays, graphical displays, etc.), filters for filtering data records, security permissions, or other data associated with a custom GUI (e.g., as described above with respect to method 500 at 504, etc.).

At 508, the computing system can generate one or more graphical user interfaces based on the graphical user interface definitions. Generating a graphical user interface can include, for example, generating one or more computer-readable instructions that, when executed by a computing device, will cause the computing device to provide the graphical user interface to a user. Computer-readable instructions can include, for example, computer code (e.g., source code, machine code, bytecode, etc.), one or more queries (e.g., in a custom query language), custom GUI definition data configured to be read by an application (e.g., application associated with an organizational database management system, etc.), or other appropriate computer-readable instructions. In some instances, the computer-readable instructions can include, for example, instructions configured to be executed by a web browser application (e.g., HTML, JavaScript, PHP, etc.). In some instances, the computer-readable instructions can include, for example, an executable file. In some instances, a GUI application associated with an organizational data management platform can generate a graphical user interface based on a graphical user interface definition. For example, the application can retrieve, from a data store, one or more custom GUI definitions; determine, based on the one or more GUI definitions, one or more GUI components (e.g., views, input components, display components, etc.) to add to the GUI application; and populate the GUI application with the GUI components. In an embodiment, the computer system can generate instructions in a custom computer language for use with an organizational data management system based on analyzing the configuration information associated with the custom GUI definition. For example, such configuration may include information associated with views of the custom GUI, custom data objects or fields associated with the custom GUI, and/or any other information associated with the custom GUI to generate instructions in a custom computer language.

In an embodiment, the computer-readable instructions may be generated (e.g., via a computer instruction generator of a custom language processing engine 318) based on a user-provided custom GUI definition and one or more of organizational data 311, application policy data 313, integration data 314, data structures 315, application object data 316, and/or any other available information. In some instances, computer-readable instructions may be generated based at least in part on one or more custom data object definitions. Generating the computer-readable instructions can include, for example, retrieving a custom data object type definition from a datastore; mapping, based on the custom data object type definition, one or more components of the custom GUI (e.g., input components, display components, etc.) to one or more data records (e.g., MongoDB documents, relational database rows, etc.), data fields (e.g., database columns, etc.), or data collections (e.g., database tables, etc.); and generating, based on the mapping, one or more computer-readable instructions for deploying the custom GUI. In some examples, the instructions generated can be provided to any user (e.g., via an application development environment 305, cloud application development environment 309, cloud development environment 317, etc.) for review, editing, approval, and/or any other purpose.

At 510, the computing system can deploy the generated graphical user interfaces. In some instances, deploying a graphical user interface can include providing the graphical user interface to a user (e.g., by displaying GUI components to the user; by distributing an application or other computer-readable instructions to the user, wherein the application is configured to cause the GUI to be displayed to the user when executed; or by otherwise causing the GUI to be displayed to a user). In some instances, deploying a GUI can include deploying one or more computer-readable instructions (e.g., instructions generated in method 500 at 508, etc.). Deploying computer-readable instructions can include, for example, writing the computer-readable instructions to an appropriate location (e.g., data store associated with active custom GUIs, etc.); initiating execution of one or more instructions of the computer-readable instructions (e.g., on a web server or client device, etc.); or other appropriate method for deploying computer-readable instructions.

In some instances, deploying the graphical user interface can include performing one or more creations, reads, updates, or deletions of one or more data records associated with a custom object type definition. For example, populating a GUI component for displaying one or more data records (e.g., list view, detail view, etc.) can include, for example, retrieving data indicative of a data filter (e.g., database query such as a query in a custom query language, etc.) for retrieving one or more data records from a data store (e.g., database, etc.); retrieving, based on the data indicative of the data filter, one or more data records associated with the data filter; and displaying, to a user via the GUI component, one or more values associated with one or more fields of each data record of the one or more data records. As another example, deploying a GUI can include providing the GUI to a user; receiving, via the GUI, a user request (e.g., a user request to create, update, or delete a data record associated with a custom data object type definition, etc.); and executing, responsive to receiving the request, one or more operations to fulfill the request. In some instances, performing a creation, read, update, or deletion can include determining, based at least in part on a custom GUI definition, a query in a custom query language; and executing the query (e.g., according to methods described above).

In some instances, deploying a GUI can include performing a join operation for combining data records associated with two or more objects (e.g., two or more custom objects, etc.). In some instances, executing a query comprising a join involving a custom-object data record can include identifying, based on the query, a join key for joining two or more object types; retrieving, from a datastore, a custom data object type definition; mapping, based on the custom data object type definition, the join key to a field for holding uniquely identifying information for one or more data records; and executing, based on the mapping, the query. In some instances, executing a query comprising a join operation can include one or more query planning or query optimization operations configured to improve or optimize a performance of the join operation. For example, in some instances, a query optimization can include determining, based on the query, which of two or more fields are indexed, wherein each of the two or more fields are used as a filter in the query; filtering, based on an indexed field of the two or more fields, one or more data records to retrieve one or more filtered data records; and further filtering, after filtering based on the indexed field, the filtered data records based on an unindexed field of the two or more fields. In some instances, a query optimization can include determining, based on a query comprising a join operation, which of two or more objects being joined is associated with fewer data records; retrieving, based on the query, one or more data records of the object associated with fewer data records; and joining, based on the query, the one or more data records to one or more second data records of another object being joined. In some instances, retrieving the one or more data records of the object associated with fewer data records can include filtering, based on the query, data records of the object to retrieve one or more filtered data records. In some instances, deploying a GUI can include retrieving, from a datastore, a custom object type definition; determining, based on the custom object type definition, one or more related objects associated with one or more fields of the custom object type definition; and performing a join operation comprising the custom object and the one or more related objects.

Figure 6:
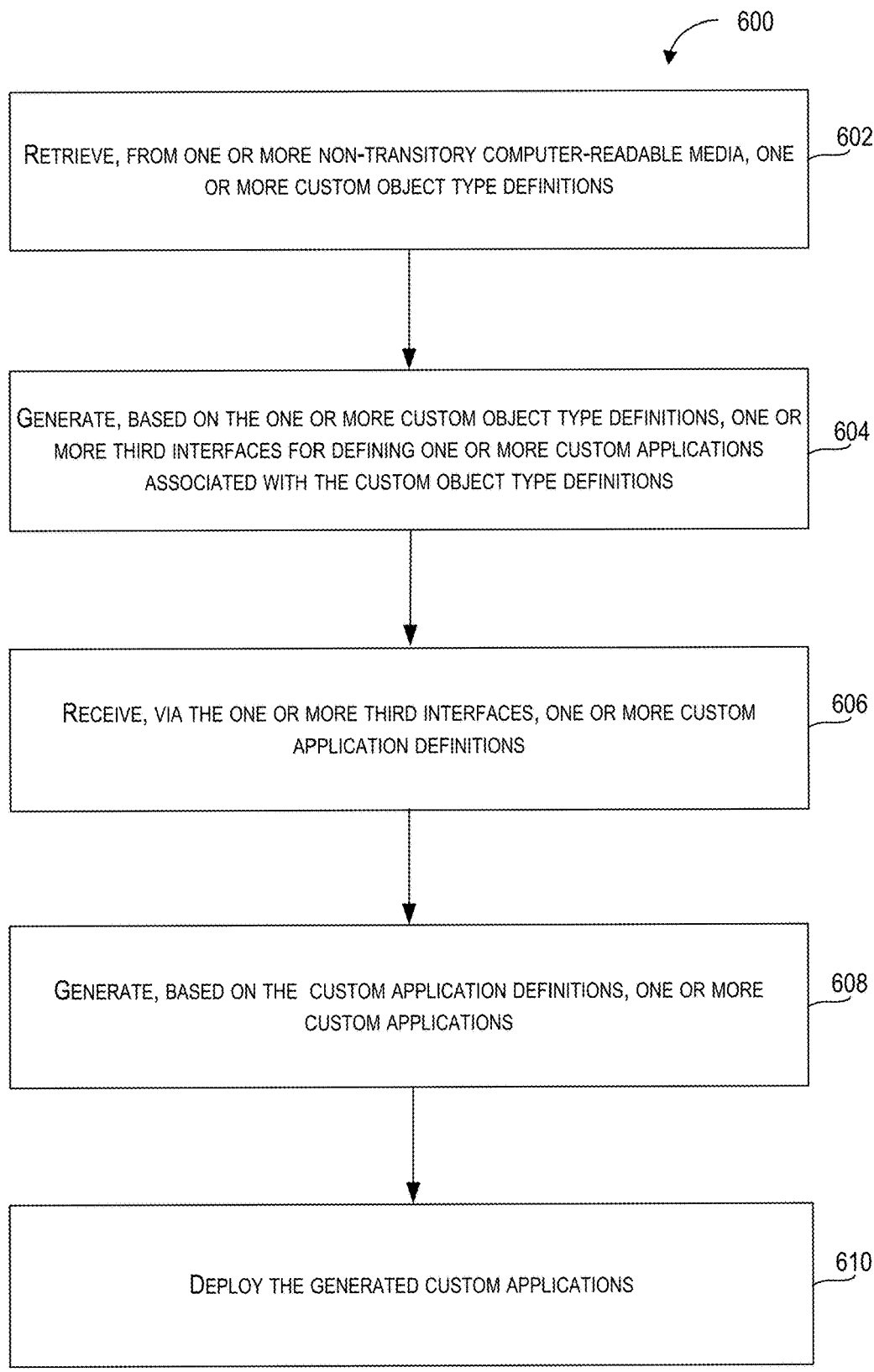
FIG. 6 depicts a flow diagram of an example method for receiving custom application definitions associated with custom objects, according to example embodiments of the present disclosure.

FIG. 6 depicts a flow diagram of an example method 600 for providing a third interface for defining a custom application associated with a custom object, according to example embodiments of the present disclosure. One or more portions of the method 600 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 600 can be executed or implemented as an algorithm on the hardware devices or systems disclosed herein. FIG. 6 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 602, a computing system comprising one or more computing devices can retrieve, from one or more non-transitory computer-readable media, one or more custom object type definitions. In some instances, method 600 at 602 can include performing actions similar to (e.g., same as) corresponding actions performed with respect to method 500 at 502.

At 604, the computing system can generate, based on the one or more custom object type definitions, one or more third interfaces for defining one or more custom applications associated with the custom object type definitions.

An interface for receiving the custom application definition can include, for example, an API, a GUI, a webhook, or any other suitable interface. For example, a user may provide information defining one or more custom applications in a computer language, in a custom computer language, and/or via one or more graphical user interfaces.

In some instances, a third interface can include a no-code or low-code GUI enabling a user to define an application without providing any user-written computer code. In some instances, a third interface GUI for defining a custom application associated with a custom data object can include a GUI view for defining general properties of the application as a whole, such as an application name (e.g., display name, etc.), a system name (e.g., file name, URL, etc.), a logo or icon associated with the application, a description, one or more permissions defining which users can and cannot access the application, or other general properties.

For example, FIG. 7D depicts an example "Create App" GUI page, which can be a first GUI view in an overall GUI workflow for no-code definition of a custom application. The example app creation page includes an input component 720 (e.g., text box) for inputting an application name; an input component 722 for uploading an icon or logo associated with the custom application; a plurality of input components 724*a-e* for defining one or more permissions rules associated with the app; an input component 726 (e.g., text box) for inputting an application description; and navigation components 728, 730 for exiting or continuing a workflow for defining a custom application.

In some instances, the example GUI can dynamically populate one or more of the input components 724*b-e* based on a user selection associated with another input component 724*a-d*. For example, responsive to a user clicking an Add Filter component 724*a*, the example GUI can dynamically add an input component 724*b* for selecting a field (e.g., field of an Employee object, etc.) for a permissions filter to be based on. In some instances, generating an input component 724*b* for selecting a field can include retrieving a custom data object type definition from a datastore; determining, based on the custom data object type definition, a plurality of fields associated with the custom object type; and populating the input component 724*b* with the fields. Responsive to a user selecting a field or clicking an Add Filter component 724*a*, the example GUI can generate an input component 724*c* for defining a filter type (e.g., must be, must not be, etc.) associated with the filter. Responsive to a user selecting a field or filter type or clicking an Add Filter component 724*a*, the example user interface can dynamically populate an input component 724*d* for defining a filter subtype (e.g., this specific value, in this range of values, one of these values, greater than or equal to, less than, etc.) associated with the permissions filter being added. Responsive to a user selecting a field, filter type, or filter subtype or clicking an Add Filter component 724*a*, the example GUI can dynamically populate an input component 724*e* for selecting one or more values or value ranges associated with the permissions filter being defined. In some instances, a type of an input component 724*d*, 724*c* (e.g., text box, numerical input, Boolean input, etc.) for defining a filter subtype or inputting a value can be based at least in part on a prior user selection, or a field type associated with a selected field. For example, responsive to a selection of a field having a numeric field type, an input component 724*d* can be populated with numeric filter subtypes such as greater than, less than, etc. Responsive to a selection of a field having a non-numeric field type, an input component 724*d* can be populated with non-numeric filter subtypes. As another example, responsive to a selection of a field having a field type comprising a date, an input component 724*e* for defining a date value can be provided, such as a calendar input component. In some instances, populating the input component 724*e* for defining values or ranges of values can include retrieving, from a data store comprising employee data associated with an organizational data management platform, a plurality of possible values associated with a field selected by the user using input component 724*b*; and populating, based on the retrieved values, the input component 724*c*. For example, in some instances, input component 724*e* can comprise a dropdown list, radio button, plurality of checkboxes, or similar selection mechanism comprising a plurality of entries, and each entry of the selection mechanism can correspond to a retrieved value of the plurality of possible values.

In some instances, a third interface GUI for defining a custom application can include one or more GUI components (e.g., dropdown lists, check boxes, etc.) for selecting one or more custom object types associated with the custom application. In some instances, a third interface GUI for defining a custom application can automatically generate, based on the selection, one or more default views for creating, reading, updating, or deleting data records associated with the custom object type; one or more default GUI views for navigating between default CRUD views; one or more default interfaces for generating or editing a query associated with the custom object type definition in a custom query language (e.g., RQL, etc.); etc. In some instances, a third interface GUI can include one or more GUI components (e.g., check boxes, etc.) for a user to select which default views to include or not include in the application. In some instances, a third interface GUI can include one or more GUI components (e.g., buttons, links, etc.) for a user to navigate to a GUI view for editing one or more default views associated with the custom application being defined.

In some instances, a third interface (e.g., GUI) for receiving a custom application definition can include a third interface (e.g., GUI) for receiving one or more graphical user interface definitions (e.g., as described above with respect to FIG. 5, etc.). For example, in some instances, a custom application can include one or more views (e.g., pages, tabs, frames, windows, dialog boxes, list views comprising a plurality of data records, detail view associated with a particular data record, custom reports, etc.) generated based on one or more corresponding custom GUI view definitions. In some instances, method 600 at 604 can include performing any action or using any system or component (e.g., interface component, computing device component) described above with respect to method 500 at 504.

In some instances, permissions associated with the application can be separate from permissions associated with individual GUI views or GUI components of the application, and separate from individual data records or objects associated with the application. As an illustrative example, a user can define a single custom application (e.g., with the same application name, icon, etc.) to be provided to both manager and non-manager employees of an organization, and can define one or more GUI views to be shown to managers using the application, and not shown to non-manager employees using the application.

In some instances, a third interface GUI can include a GUI component for sharing a custom application with others. For example, in some instances, a third interface GUI can include one or more GUI components enabling an administrator to select one or more users (e.g., by department, by role, by individual name or employee ID, etc.) to share the custom application with via each user's homepage, dashboard, or the like. In some instances, a third interface GUI can include one or more GUI components enabling a user to share a custom application in other ways. For example, a third interface GUI can include an action component (e.g., button, etc.) that, when interacted with (e.g., clicked), causes a computing device to upload the application view to an application sharing service (e.g., app store, etc.); generate a shareable link that, when clicked, enables a user to access the custom application (e.g., access through a web browser, download an executable file comprising the application, etc.); or the like.

At 606, the computing system can receive, via the one or more third interfaces, one or more custom application definitions. In some instances, method 600 at 606 can comprise one or more actions described above with respect to method 500 at 506.

At 608, the computing system can generate one or more custom applications based on the graphical user interface definitions. In some instances, method 600 at 608 can include one or more actions described above with respect to method 500 at 508.

At 610, the computing system can deploy the generated custom applications. Deploying the generated custom applications can include, for example, hosting the custom applications (e.g., on a web server, etc.), distributing the custom applications (e.g., by distributing an executable file, etc.), or otherwise providing one or more users with access to the generated custom applications. In some instances, deploying the custom application can include receiving, via the custom application, a user request to perform an action comprising a creation, read, update, or deletion of a data record associated with a custom object type associated with the custom application; and performing, responsive to the request, the requested action. In some instances, deploying a custom application can include one or more actions described above with respect to deploying a custom GUI (e.g., with respect to method 500 at 510).

In some instances, deploying a custom application can further include deploying a plurality of custom GUIs (e.g., as described with respect to method 500 at 510). For example, a custom application definition can include a plurality of custom GUI definitions (e.g., defining custom GUI pages, tabs, windows, etc.; custom GUI components such as custom buttons associated with custom actions, custom data tables populated based on custom data filters, etc.). In such instances, deploying a custom application can include providing, responsive to a user request, a first GUI (e.g., application homepage, etc.) associated with the application; receiving, via the first GUI, a user request to navigate to a second GUI of the custom application; and providing, responsive to the user request to navigate to the second GUI, the second GUI to the user. In some instances, the first GUI and/or second GUI can be associated with a custom GUI definition. In such instances, providing the first or second GUI can include retrieving, from a data store, a custom GUI definition associated with the first or second GUI; generating, based at least in part on the custom GUI definition, one or more GUI components defined by the custom GUI definition; and providing, to the user, the first or second GUI comprising the one or more GUI components.

FIGS. 7A through 7I generally depict an example workflow comprising a plurality of example GUI components associated with defining a custom object type; defining one or more custom applications associated with the custom object type; and defining one or more custom GUI views associated with the custom application.

FIG. 7A depicts an example homepage or user dashboard 700 in which a user does not yet have access to any custom applications defined according to examples of the present disclosure. For example, the example homepage provides the user with a GUI navigation component 702 for navigating to a data manager GUI (e.g., as depicted below in FIGS. 7B-C), which can display information associated with one or more custom object types or non-custom object types (e.g., native objects of an organizational data management platform, etc.), but indicates via display component 704 that the user does not currently have access to any Unity Applications (e.g., user-defined custom applications associated with a custom object type, etc.).

FIG. 7B depicts a first GUI view of an example data manager GUI. The first GUI view includes a GUI selection component 706 for selecting whether to view all objects; all fields; or all data associated with a particular data category. For example, as depicted, a user has selected "All objects" in the GUI selection component 706, and has selected an "Audits" category in a category selection component 708. Responsive to the user's selections, the first GUI view has displayed a plurality of rows 710 associated with a plurality of custom object type definitions. For example, as depicted, a user has defined three custom object types of the "Audits" category: Audit, Audit Item, and Audit Run. Each row 710 depicts, for example, an object name, object category, API name, object type (e.g., custom, native, etc.), and a date on which the custom object type definition was last modified. In some instances, each row 710 can comprise a clickable navigation component, such that a user can navigate to a second GUI view (e.g., as depicted below with respect to FIG. 7C) by clicking on the row 710. FIG. 7B also depicts a Create Custom Object navigation component 712 for navigating to a first interface for defining a custom object type definition.

FIG. 7C depicts a second GUI view of an example data manager GUI, wherein all fields of an Audit object are displayed. For example, the second GUI component can include a table showing all fields of one or more objects, and each row 713 of the table can display one or more properties of the field, such as field display name, data type, API name, field type (e.g., standard, custom, formula, etc.), whether the field is required when creating or editing a data record of the custom object type, and whether a value entered into the field must be unique (i.e. must not match a corresponding value of any previous data record) when creating or editing a data record of the custom object type. In some instances, a first GUI view or second GUI view can include a search GUI component 714 enabling a user to search for a particular custom data object (e.g., in the first GUI view) or a particular field (e.g., in the second GUI view). In some instances, a second GUI view can include one or more navigation components 716, 718 to navigate to a GUI view for editing, adding, or deleting a field associated with the custom object type.

FIG. 7D depicts an example first GUI view for defining a custom application, which can operate as described above with respect to FIG. 6.

FIG. 7E depicts an example first GUI view for defining a custom GUI view, which can operate as described above with respect to FIG. 5.

FIG. 7F depicts an example first GUI view for defining a custom GUI view, which can operate as described above with respect to FIG. 5.

FIG. 7G depicts an example first GUI view for defining a custom GUI view, which can operate as described above with respect to FIG. 5.

Figure 7H:
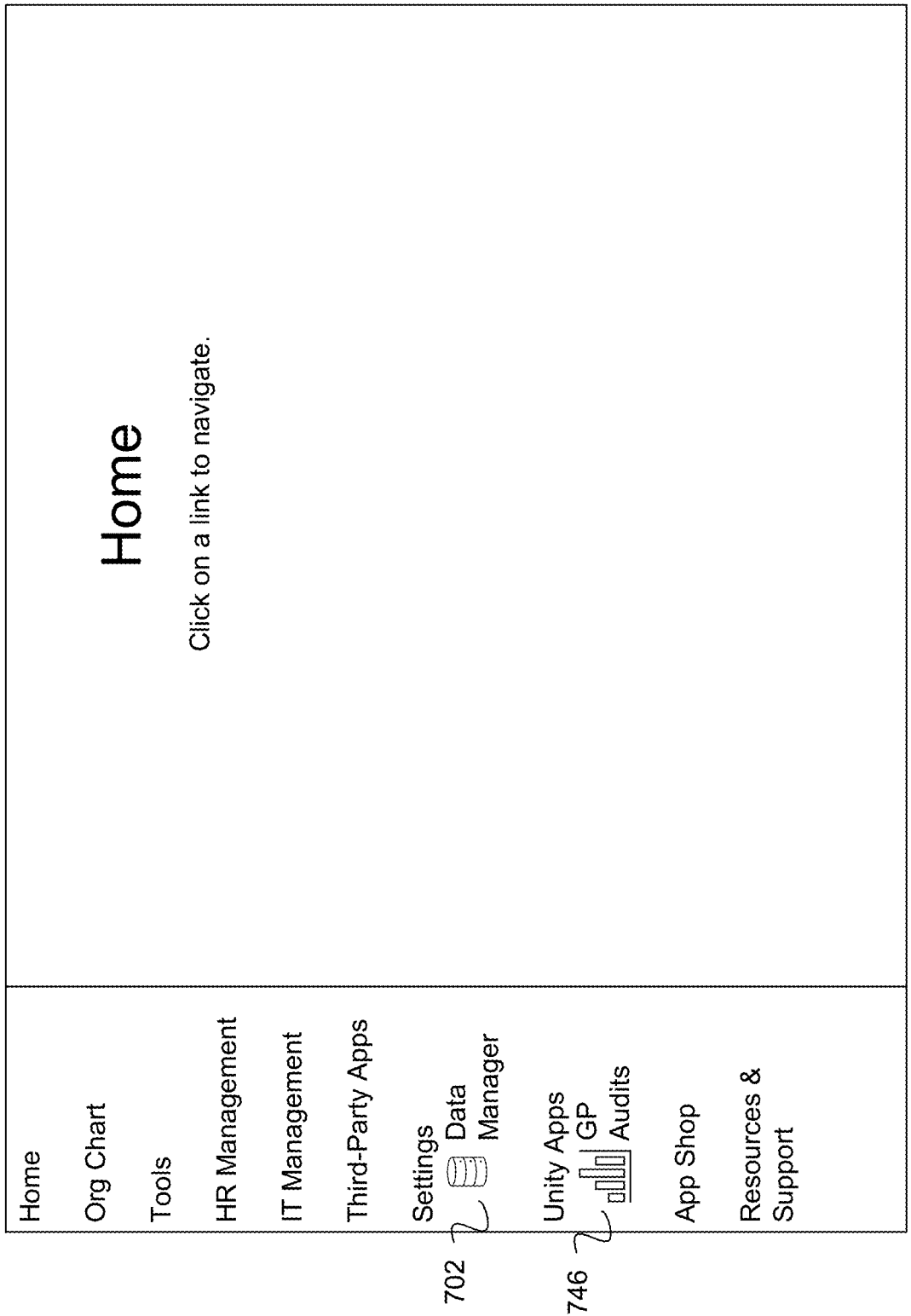
FIG. 7H depicts an illustration of an eighth view of an example user interface for defining a custom data object, custom application, or custom user interface, according to example embodiments of the present disclosure.

FIG. 7H depicts an example homepage or dashboard GUI in which a user now has access to a navigation component 746 for navigating to a newly defined GP audits app.

FIG. 7I depicts an example GUI view of the custom GP audits app. For example, as depicted, the example GUI view includes navigation components 748, 750 for navigating between views associated with Audit objects and Audit Item objects; and between views associated with All Audits (i.e., all data records of the relevant object type); My Audits (i.e., data records filtered by Owner, wherein the Owner is the user of the example GUI of FIG. 7I); and My Team's Audits (i.e., data records filtered by Owner, wherein the Owner's Team field has a value matching a Team field of the user of the example GUI of FIG. 7I). The GUI also includes a display component 752 for displaying the views the user navigates to. As depicted, the display component 752 is displaying a custom view comprising a subset of five of the Audit object's seven fields, in an order chosen by a user (e.g., user of the application of FIGS. 7H-I, user of the third interface 7F for defining the application, etc.). The example view of FIG. 7I also includes a navigation component 754 for navigating to a GUI view (e.g., page, etc.) for adding a data record associated with the GP Audits application (e.g., Audit data object, Audit Item data object, etc.).

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system that implements an organizational management platform for an organization, the computer system comprising:
   one or more processors;
   one or more databases that collectively store organizational data associated with the organization, wherein the organizational data comprises an object graph data structure comprising a plurality of data objects that respectively correspond to a plurality of entities of the organization; and
   one or more non-transitory computer-readable media that collectively store instructions that, when executed by the one or more processors, cause the computer system to perform operations, the operations comprising:
      providing one or more first interfaces for defining one or more custom objects;
      receiving, via the one or more first interfaces, at least one custom object definition comprising one or more data fields;
      responsive to receiving the at least one custom object definition: adding a custom object associated with the custom object definition to the object graph data structure; and adding, to the object graph data structure based on the custom object definition, one or more edges between the custom object and one or more other objects;
      automatically generating, based on the at least one custom object definition, one or more second interfaces for configuring one or more graphical user interfaces;
      receiving, via the one or more second interfaces, at least one graphical user interface configuration defining a layout for a graphical user interface associated with the at least one custom object definition;
      generating, based on the graphical user interface configuration, at least one third interface, wherein the third interface comprises at least one graphical user interface having the layout; and
      providing, to one or more users, the at least one third interface.

2. The computer system of claim 1, wherein the one or more other objects comprise at least one custom object defined through the one or more first interfaces.

3. The computer system of claim 1, wherein the one or more other objects comprise at least one non-custom object native to an organizational data management application associated with the one or more databases.

4. A computer-implemented method for performing processing of computer instructions, comprising:
   providing, by a computing system comprising one or more computing devices, one or more first interfaces for defining one or more custom objects;
   receiving, by the computing system via the one or more first interfaces, at least one custom object definition comprising one or more data fields;
   responsive to receiving the at least one custom object definition: adding a custom object associated with the custom object definition to the object graph data structure; and adding, to the object graph data structure based on the custom object definition, one or more edges between the custom object and one or more other objects;
   automatically generating, by the computing system based on the at least one custom object definition, one or more second interfaces for configuring one or more graphical user interfaces;
   receiving, by the computing system via the one or more second interfaces, at least one graphical user interface configuration defining a layout for a graphical user interface associated with the at least one custom object definition;
   generating, by the computing system based on the graphical user interface configuration, at least one third interface, wherein the third interface comprises at least one graphical user interface having the layout; and
   providing, by the computing system to one or more users, the at least one third interface.

5. The computer-implemented method of claim 4, wherein the one or more second interfaces comprise a graphical user interface configured to enable no-code definition of the at least one graphical user interface configuration.

6. The computer-implemented method of claim 4, wherein the one or more second interfaces comprise at least one interface for defining a custom application, and further comprising:
   receiving, by the computing system via the one or more second interfaces, at least one custom application definition defining a custom application associated with the at least one custom object definition;
   generating, by the computing system based on the custom application definition, at least one custom application; and
   providing, by the computing system to one or more users, the at least one custom application.

7. The computer-implemented method of claim 6, further comprising:
   determining, by the computing system based on one or more data access rules, that a user should have access to a first custom application defined through the one or more second interfaces;
   determining, by the computing system based on the one or more data access rules, that the user should not have access to a second custom application defined through the one or more second interfaces; and
   providing, by the computing system to the user, an interface comprising a mechanism to access the first custom application and not comprising a mechanism to access the second custom application.

8. The computer-implemented method of claim 7, wherein the data access rules are first data access rules, and further comprising:
   determining, by the computing system based on one or more second data access rules, that the user should not have access to one or more first data records associated with the second custom application;
   determining, by the computing system based on the one or more second data access rules, that the user should have access to one or more second data records associated with the second custom application; and
   providing, by the computing system to the user via the second custom application, access to the one or more second data records without providing access to the one or more first data records.

9. The computer-implemented method of claim 4, further comprising:
   storing, by the computing system responsive to receiving the at least one custom object definition, the at least one custom object definition in a data store;
   wherein automatically generating the one or more second interfaces comprises:
      retrieving, by the computing system, the at least one custom object definition from the data store.

10. The computer-implemented method of claim 4, wherein automatically generating the at least one third interface comprises:
- determining, by the computing system based on one or more data access rules, that a first custom object defined through the one or more first interfaces should not be included in the one or more second interfaces; and
- determining, by the computing system based on the one or more data access rules, that a second custom object defined through the one or more first interfaces should be included in the one or more second interfaces;
- wherein the one or more third interfaces comprise a component for at least one of: creating, reading, updating, or deleting a data record associated with the second custom object; and
- wherein the one or more third interfaces do not comprise a component for creating, reading, updating, or deleting a data record associated with the first custom object.

11. The computer-implemented method of claim 10, wherein the one or more data access rules are first data access rules, and further comprising:
- determining, by the computing system based on one or more second data access rules, that a requester should not have access to one or more first data records associated with the second custom object;
- determining, by the computing system based on the one or more second data access rules, that the requester should have access to one or more second data records associated with the second custom object; and
- providing, by the computing system to the requester via the at least one third interface, access to the one or more second data records without providing access to the one or more first data records.

12. The computer-implemented method of claim 4, further comprising:
- receiving, by the computing system via the at least one third interface, a request to perform an action, the action comprising at least one of a creation, read, update, or deletion of a data record associated with the at least one custom object definition; and
- performing, by the computing system responsive to receiving the request, the action.

13. The computer-implemented method of claim 12, wherein:
- the at least one custom object definition comprises one or more user-defined data validation rules; and
- the request comprises one or more values associated with one or more fields of the data record;
- and further comprising:
  - validating, based on the one or more user-defined data validation rules, the one or more values.

14. The computer-implemented method of claim 4, wherein:
- the at least one graphical user interface configuration comprises at least one component for requesting performance of a custom action; and
- the one or more second interfaces comprise at least one interface for defining the custom action.

15. The computer-implemented method of claim 4, wherein:
- the at least one third interface comprises at least one search interface; and
- the one or more second interfaces comprise at least one interface for customizing a display associated with the at least one search interface.

16. The computer-implemented method of claim 4, wherein the graphical user interface comprises an interface for editing the layout.

17. The computer-implemented method of claim 4, wherein the at least one graphical user interface configuration comprises a query written in a custom query language; and
- the one or more second interfaces comprise an interface for editing the query.

18. The computer-implemented method of claim 17, wherein a syntax of the custom query language with respect to custom objects is identical to a syntax of the custom query language with respect to non-custom objects.

19. One or more tangible non-transitory computer-readable media storing computer-readable instructions that, when executed by one or more processors, cause the one or more processors to perform operations, the operations comprising:
- providing one or more first interfaces for defining one or more custom objects;
- receiving, via the one or more first interfaces, at least one custom object definition comprising one or more data fields;
- responsive to receiving the at least one custom object definition: adding a custom object associated with the custom object definition to the object graph data structure; and adding, to the object graph data structure based on the custom object definition, one or more edges between the custom object and one or more other objects;
- automatically generating, based on the at least one custom object definition, one or more second interfaces for configuring one or more graphical user interfaces;
- receiving, via the one or more second interfaces, at least one graphical user interface configuration defining a layout for a graphical user interface associated with the at least one custom object definition;
- generating, based on the graphical user interface configuration, at least one third interface, wherein the third interface comprises at least one graphical user interface having the layout; and providing, to one or more users, the at least one third interface.

* * * * *